United States Patent
Kumar et al.

(10) Patent No.: US 10,827,300 B2
(45) Date of Patent: *Nov. 3, 2020

(54) OPPORTUNISTIC SIGNAL RECEPTION FOR MOBILE DEVICE POSITION LOCATION ESTIMATION

(71) Applicant: QUALCOMM Incorporated, San Diego, CA (US)

(72) Inventors: Akash Kumar, Hyderabad (IN); Amit Jain, San Diego, CA (US); Ankita, Hyderabad (IN); Muthukumaran Dhanapal, Sunnyvale, CA (US); Shravan Kumar Raghunathan, San Diego, CA (US); Parthasarathy Krishnamoorthy, San Diego, CA (US); Hargovind Prasad Bansal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,782

(22) Filed: Nov. 7, 2019

(65) Prior Publication Data

US 2020/0077225 A1 Mar. 5, 2020

Related U.S. Application Data

(62) Division of application No. 15/704,310, filed on Sep. 14, 2017, now Pat. No. 10,511,929.

(51) Int. Cl.
*H04W 4/02* (2018.01)
*G01S 5/02* (2010.01)
(Continued)

(52) U.S. Cl.
CPC .............. *H04W 4/02* (2013.01); *G01S 5/0236* (2013.01); *G01S 5/0252* (2013.01); *G01S 5/10* (2013.01); *H04W 64/00* (2013.01)

(58) Field of Classification Search
CPC ....... H04W 48/16; H04W 4/02; H04W 64/00; H04W 24/10; H04W 36/0088;
(Continued)

(56) References Cited

U.S. PATENT DOCUMENTS

| 8,396,047 B2 | 3/2013 | Krishnamurthy et al. |
| 8,447,327 B2 | 5/2013 | Escolar-Piedras et al. |

(Continued)

FOREIGN PATENT DOCUMENTS

| WO | WO-2012099515 A1 | 7/2012 |
| WO | WO-2014093400 A1 | 6/2014 |

(Continued)

OTHER PUBLICATIONS

International Search Report and Written Opinion—PCT/US2018/050795—ISA/EPO—dated Jan. 4, 2019.

*Primary Examiner* — Diane D Mizrahi
(74) *Attorney, Agent, or Firm* — Thien T. Nguyen

(57) ABSTRACT

Techniques are provided to initiate signal transmissions for possible opportunistic reception by a mobile device, and/or to initiate opportunistic reception of signal transmissions for use in mobile device position location estimation. For example, a mobile device may use assistance data to identify a first signal to be transmitted over a first frequency band and a second signal to be transmitted over a second frequency band during a specific period of time. At least a portion of the second frequency band may be outside of the first frequency band. The mobile device subsequently attempts to opportunistically receive at least the first signal and the second signal via a receiver tuned to a reception frequency (Continued)

band that encompasses at least the first frequency band and the second frequency band. The mobile device may then process the opportunistically received signals to obtain measurements corresponding to at least the first and second signals.

10 Claims, 9 Drawing Sheets

(51) Int. Cl.
*G01S 5/10* (2006.01)
*H04W 64/00* (2009.01)

(58) Field of Classification Search
CPC ............ H04W 64/006; H04W 56/001; H04W 56/006; H04W 84/042; G01S 5/0236; G01S 5/0252; G01S 5/10
See application file for complete search history.

(56) References Cited

U.S. PATENT DOCUMENTS

| | | | |
|---|---|---|---|
| 9,554,354 | B2 | 1/2017 | Sheynblat et al. |
| 10,511,929 | B2 * | 12/2019 | Kumar ................. H04W 64/00 |
| 2011/0077707 | A1 | 3/2011 | Maile et al. |
| 2014/0073352 | A1 | 3/2014 | Aldana et al. |
| 2014/0349677 | A1 | 11/2014 | Xiao et al. |
| 2015/0373494 | A1 | 12/2015 | Van Rijn et al. |
| 2016/0050534 | A1 | 2/2016 | Lim et al. |
| 2016/0116566 | A1 | 4/2016 | Boyd |
| 2018/0332430 | A1 | 11/2018 | Kumar et al. |

FOREIGN PATENT DOCUMENTS

| | | |
|---|---|---|
| WO | WO-2016126713 A1 | 8/2016 |
| WO | WO-2016130075 A1 | 8/2016 |

* cited by examiner

700 ↘

┌─────────────────────────────────────────────────────────────────────┐
│ Receive assistance data indicative of a plurality of signals to be transmitted by │
│ one or more transmitting devices                                    │
└─────────────────────────────────────────────────────────────────────┘
                                    ↓ ↳ 701
┌─────────────────────────────────────────────────────────────────────┐
│ Identify, based at least in part on the assistance data, at least a first signal of │
│ the plurality of signals to be transmitted over a first frequency band and a │
│ second signal of the plurality of signals to be transmitted over a second │
│ frequency band during a reception window, wherein at least a portion of the │
│ second frequency band is outside of the first frequency band and the second │
│ frequency band is narrower than the first frequency band            │
└─────────────────────────────────────────────────────────────────────┘
                                    ↓ ↳ 702
┌─────────────────────────────────────────────────────────────────────┐
│ Receive at least the first signal and the second signal via a receiver tuned to a │
│ reception frequency band, wherein the reception bandwidth encompasses at │
│ least the first frequency band and the second frequency band        │
└─────────────────────────────────────────────────────────────────────┘
                                    ↓ ↳ 704
┌─────────────────────────────────────────────────────────────────────┐
│ Measure a first time of arrival corresponding to reception of the first signal and │
│ a second time of arrival of corresponding to reception of the second signal │
└─────────────────────────────────────────────────────────────────────┘
                                    ↓ ↳ 706
┌─────────────────────────────────────────────────────────────────────┐
│ Obtain a location of the mobile device, that is based, at least in part, on the first │
│ time of arrival measurement, the second time of arrival measurement, or both │
└─────────────────────────────────────────────────────────────────────┘
                                      ↳ 708

701 ← ┄┄ Transmit an indication of signal measuring capability of the mobile device ┄┄ 712

702
 ↓
704
 ↓
706 → ┄┄ Transmit a signal to at least one other device indicating the first time of arrival measurement, the second time of arrival measurement, or both ┄┄ 709    Receive the location of the mobile device from the at least one other device ┄┄ 710

↳ 708

FIG. 7B ent application Ser. No. 15/704,310 entitled "OPPORTUNIS-
OPPORTUNISTIC SIGNAL RECEPTION FOR MOBILE DEVICE POSITION LOCATION ESTIMATION

CLAIM OF PRIORITY UNDER 35 U.S.C. § 120

The present application for Patent is a divisional of patent application Ser. No. 15/704,310 entitled "OPPORTUNISTIC SIGNAL RECEPTION FOR MOBILE DEVICE POSITION LOCATION ESTIMATION" filed Sep. 14, 2017, and assigned to the assignee hereof and hereby expressly incorporated by reference herein.

BACKGROUND

Field

Subject matter disclosed herein relates to wireless signal-based position location estimation, and more particularly to techniques that may be implemented, at least in a part, to initiate certain signal transmissions for possible opportunistic reception by a mobile device, or to initiate an attempt by a mobile device to opportunistically receive certain signal transmissions.

Information

The position location of a mobile device, such as a cellular telephone, may be useful or essential to a number of applications including emergency calls, navigation, direction finding, asset tracking, Internet service, or the like. The position location of a mobile device may be estimated based on information gathered from various systems. In a wireless network implemented according to 4G (also referred to as Fourth Generation) Long Term Evolution (LTE) radio access, for example, a transmitting device (e.g., a base station device) may transmit a positioning reference signal (PRS). A mobile device acquiring (receiving) PRSs transmitted by different base station devices may obtain signal-based measurements that may be used in computing a position location estimate of the mobile device, for example, by applying observed time difference of arrival (OTDOA) techniques.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIGS. 7A and 7B are block diagrams illustrating processes that may be performed by a mobile device, for example, as in FIG. 1, to receive signals for use in position location estimation, in accordance with certain example implementations;

Figure 1:
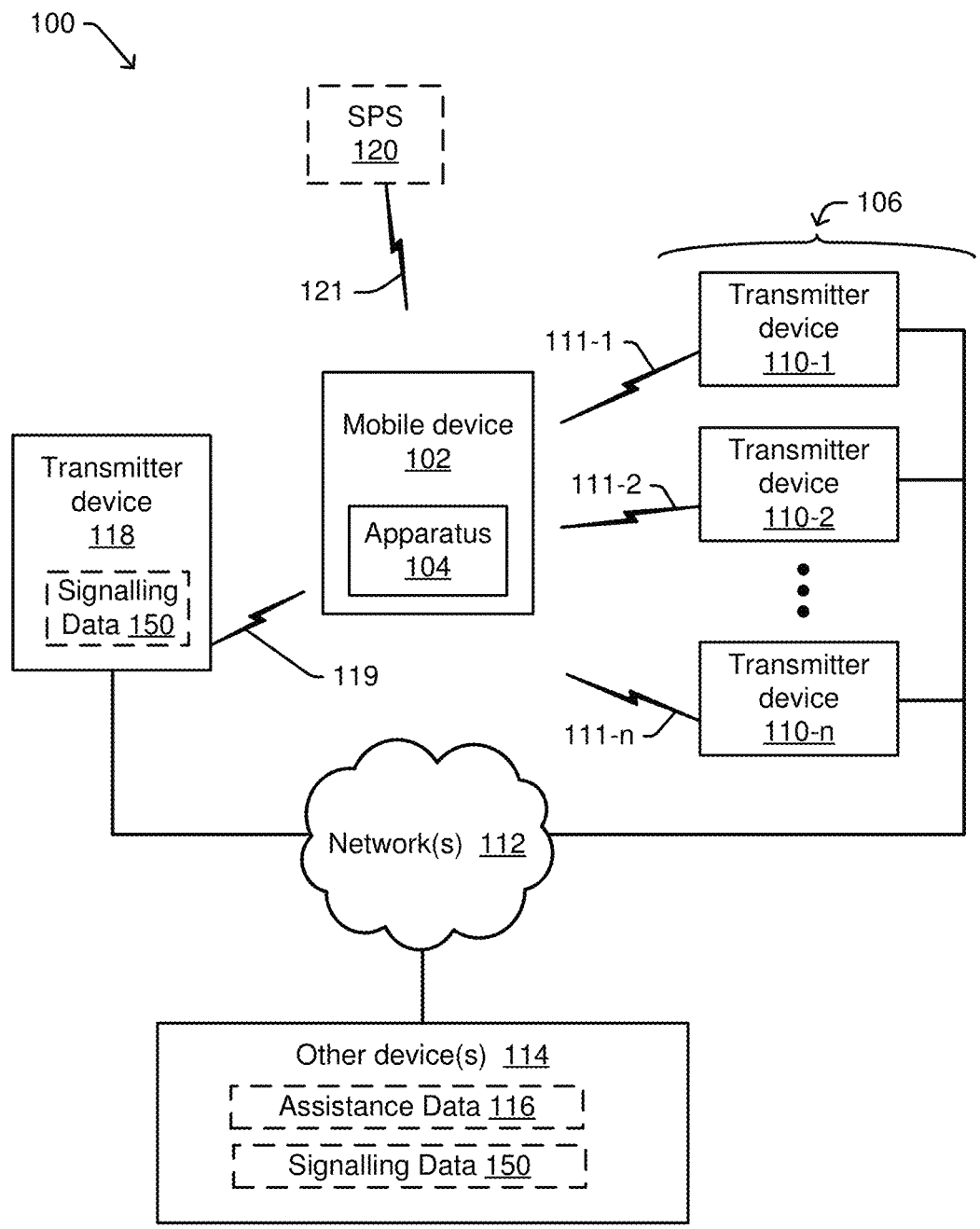
FIG. 1 is a schematic block diagram illustrating certain aspects of a wireless network environment in which a mobile device may receive signals from transmitting devices for use in position location estimation, in accordance with certain example implementations.

Reference is made in the following detailed description to accompanying drawings, which form a part hereof, wherein like numerals may designate like parts throughout that are identical, similar and/or analogous. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. Therefore, the following detailed description is not to be taken to limit claimed subject matter and/or equivalents.

SUMMARY

In accordance with certain aspects, a method may be implemented by a mobile device for use in measuring a plurality of signals, e.g., for position location estimation.

The method may comprise, based, at least in part, on received assistance data, identifying at least a first signal to be transmitted over a first frequency band and a second signal to be transmitted over a second frequency band during a reception window, wherein at least a portion of the second frequency band is outside of the first frequency band. The method may comprise subsequently receiving at least the first signal and the second signal via a receiver tuned to a reception frequency band, wherein the reception frequency band encompasses at least the first frequency band and the second frequency band. The method may comprise measuring a first time of arrival corresponding to reception of the first signal and a second time of arrival of corresponding to reception of the second signal.

In accordance with another aspect, a mobile device may be provided which comprises a receiver and a processing unit. Here, for example, the receiver may be configured to receive assistance data that is indicative of a plurality of signals to be transmitted by one or more transmitting devices, and to tune to a reception frequency band to receive at least a first signal of the plurality of signals transmitted over a first frequency band and a second signal of the plurality of signals transmitted over a second frequency band during a reception window, wherein the reception frequency band encompasses at least the first frequency band and the second frequency band, at least a portion of the second frequency band is outside of the first frequency band, and the second frequency band is narrower than the first frequency band. The processing unit may be coupled to the receiver and configured to determine the reception frequency band and the reception window based, at least in part, on the assistance data, measure a first time of arrival corresponding to reception of the first signal and a second time of arrival corresponding to reception of the second signal, and obtain a location of the mobile device, wherein the location is based, at least in part, on the first time of arrival measurement, the second time of arrival measurement, or both.

In accordance with still another aspect, a method for use in a computing platform may be provided. The method may comprise, with the computing platform, receiving at least one indication of signal measuring capability from a mobile device;
based, at least in part, on the at least one indication of signal measuring capability, generating: (1) assistance data for the mobile device; (2) signaling data for at least one transmitting device; or (3) both (1) and (2). The method may further comprise, with the computing platform, providing the assistance data to the mobile device, or providing the signaling data to at least the at least one transmitting device, or both.

In accordance with yet another aspect, a computing platform comprising at least a communication interface and a processing unit may be provided. For example, the communication interface which may be coupled to the processing unit may be configured to receive at least one indication of signal measuring capability from a mobile device. The processing unit may be configured to, based, at least in part, on the at least one indication of signal measuring capability, generate: (1) assistance data for the mobile device, (2) signaling data for at least one transmitting device, or (3) both (1) and (2). The processing unit may further be configured to initiate transmission, via the communication interface, of the assistance data to the mobile device if generated, and/or the signaling data to at least the at least one transmitting device if generated.

DETAILED DESCRIPTION

Various example techniques are presented herein that may be of use by a mobile device in measuring certain characteristics of wireless signals to support wireless signal-based position location estimation. Some of these techniques may permit a mobile device to operate more efficiently or effectively by opportunistically receiving (from the same transmitting device or from different transmitting devices) and measuring two or more wireless signals for use in position location during a particular period of time by tuning a receiver to an appropriate reception frequency band encompassing the respective frequency bands of the two or wireless signals.

By way of an initial example, a mobile device may be configured to receive assistance data and process the received assistance data to identify that at least a first signal is to be transmitted over a first frequency band and a second signal is to be transmitted over a second frequency band during a reception window. In certain instances, at least a portion of the second frequency band may be outside of the first frequency band. Furthermore, in certain instances, the first and second frequency bands may have different bandwidths. For example, in some instances the second frequency band may be significantly narrower in bandwidth than the first frequency band. The mobile device may subsequently receive at least the first signal and the second signal using a receiver that is opportunistically tuned to a reception frequency band that encompasses at least the first frequency band and the second frequency band. The mobile device may further measure a first time of arrival corresponding to reception of the first signal and a second time of arrival of corresponding to reception of the second signal. One or more of such measured times of arrival may be used to determine a position location estimate of the mobile device, e.g., using known multilateration (e.g., trilateration) techniques. A determination of a position location estimate may be performed by the mobile device alone, by one or more other devices, or by the mobile device along with one or more other devices.

By way of a specific example, in certain implementations a mobile device may be configured to measure positioning reference signals (PRSs) or other signals that may be useful for wireless signal-based position location estimation using observed time difference of arrival (OTDOA) or other like techniques. While some of the examples presented herein reference the use of PRSs and OTDOA, it should be understood that claimed subject matter is not intended to be limited to just these examples.

As described in greater detail herein, a mobile device may generate a signal reception plan based, at least in part, on assistance data received from another device (e.g., a location server, a network node, or the like). Received assistance data may comprise information to indicate that one or more transmitting devices are capable of transmitting wireless signals to the mobile device, e.g., to support position location estimation. For example, assistance data may identify one or more serving or neighbor base station devices, beacon transmitting devices, or the like, which are each capable of transmitting a PRS. Received assistance data may comprise timing, schedule or other related information to indicate that, during one or more specific periods of time in the future (e.g., possibly corresponding to all or part of one or more particular measurement occasions, all or part of one or more particular measurement gaps, etc.), the mobile device may be able to receive one or more PRSs that are expected to be transmitted by one or more transmitting devices. For example, received assistance data may indicate timing offset values or the like for an expected PRS transmission. Received assistance data may comprise frequency band related information corresponding to a particular transmitting device, a particular PRS transmission, etc. For example, received assistance data may be indicative of a predefined channel or a center frequency and bandwidth corresponding to wireless signal to be transmitted by a specific transmitting device, possibly associated with a particular (e.g., neighbor) cell. Received assistance data may, for example, indicate that a specific transmitting device is expected to transmit a "wideband" PRS, a "narrowband" PRS, or possibly both. Indeed, some received assistance data may be likewise indicative of a plurality of expected PRS transmissions associated with a plurality of transmitting devices, possibly associated with one or more cells, which may comprise "wideband" PRSs, "narrowband" PRSs, or some combination thereof.

As illustrated in greater detail herein, a wideband PRS may be transmitted over a wideband PRS frequency band, and a narrowband PRS may be transmitted over one or more narrowband PRS frequency bands (for example, in certain implementations some narrowband PRS may be transmitted according to a frequency hopping scheme). In certain instances, a wideband PRS frequency band may overlap at least a portion of one or more narrowband PRS frequency bands. In still other instances, a narrowband PRS frequency band may overlap at least a portion of a guard-band or other like part of a wideband PRS frequency band. In yet another instance, a particular narrowband PRS frequency band may be outside of any part of a given wideband PRS frequency band.

As used herein, the terms "wideband" and "narrowband" are intended to simply indicate that, in a relative sense, the intended frequency band of a "wideband" transmitted signal is greater (wider) than the intended frequency band of a "narrowband" transmitted signal. Thus, while some (possibly standardized) communication systems may define specific channels, frequency bands, bandwidths, center frequencies, etc., corresponding to certain wideband and narrowband wireless signals, subject matter claimed herein is not intended to be so limited.

As described in greater detail herein, based at least in part on received assistance data, a mobile device may determine that one or more opportunities exist in the future for which it may plan to tune (e.g., adjust, set, etc.) a frequency band of a receiver of an onboard communication interface (e.g., radio, modem) to cover a specific plurality of PRS frequency bands. For example, a mobile device may apply a signal reception plan that may specify a reception frequency band corresponding to a reception window. For example, a reception frequency band may indicate channel(s), or a center frequency and bandwidth, or the like, that may be used to initiate subsequent reception and measurement of one or more wideband PRSs transmitted over one or more wideband PRS frequency bands and one or more narrowband PRSs transmitted over one or more narrowband PRS frequency bands. Accordingly, the mobile device may measure times of arrival or other characteristics for a plurality of PRS that are received during a single period of time. Thus, rather than having to separately receive PRSs transmitted over different frequency bands during different multiple different measurement occasions or possibly multiple different measurement gaps, it may be possible in certain instances, to opportunistically receive a plurality of PRSs during a reception window that may possibly be a relatively shorter period of time (e.g., during all or part of a measurement opportunity, during all or part of a measurement gap, etc.). In certain instances, a plurality of reception windows may be planned and used, but which may still improve the efficiency of a mobile device at least with regard to receiving and measuring signals over time.

A mobile device may be configured to transmit provide signal measurement information to one or more other devices. For example, signal measurement information may indicate a first time of arrival measurement for a first signal, a second time of arrival measurement signal, etc. Such signal measurement information may permit a location service capability to determine a position location estimate of the mobile device. For example, a location server or other like network capability may provide a network-based or possibly network-assisted location service to perform multilateration or other like applicable techniques based, at least in part, on one or more signal measurements provided by the mobile device. Of course, in certain instances, the mobile device may be configured provide similar mobile device-based location services.

In certain implementations, as described in greater detail herein, a mobile device may transmit one or more signals to one or more other devices, to indicate one or more signal measuring capabilities of the mobile device. For example, an indication of a signal measuring capability may correspond to certain limitations or other operating capabilities of a receiver. Thus, an indication of signal measuring capability may indicate a maximum tunable bandwidth, a range or list of channels or frequency bands supported, or other like information relating to one or more onboard receivers. In another example, an indication of a signal measuring capability may correspond to a maximum, minimum or some other preferred contiguous period of time during which multiple signals (e.g., PRSs) may be received by an onboard receiver or otherwise processing (e.g., decoded, measured). Similarly, an indication of a signal measuring capability may correspond to an available processing capability that may affect how many or possibly the types of signals that a mobile device may be configured to process (e.g., receive, store, decode, measure, etc.). Of course, these represent just a few examples, and claimed subject matter is not necessary so limited.

Attention is now drawn to FIG. 1, which is a schematic block diagram illustrating certain aspects of a wireless network environment 100 in which a mobile device 102 may receive signals (e.g., 111-1, . . . , 111-n, 119) from respective transmitting devices (e.g., 110-1, . . . , 110-n, 118) for use in position location estimation, in accordance with certain example implementations.

Figure 2:
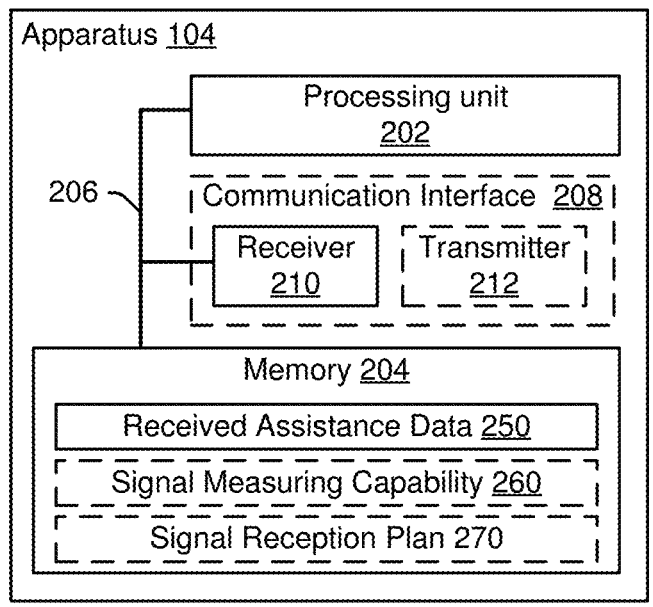
FIG. 2 is a schematic block diagram illustrating some features of an apparatus that may be implemented a mobile device, for example, as in FIG. 1, and configured to receive signals for use in position location estimation, in accordance with certain example implementations.

As illustrated, mobile device 102 may comprise an apparatus 104. Apparatus 104 may be configured to apply a signal reception plan that allows mobile device to opportunistically measure multiple different signals. FIG. 2 below presents some features that may be provided in an example apparatus 104.

Wireless network environment 100, as shown in FIG. 1, may comprise at least a portion of at least one wireless network 106, as represented, in part, by a plurality of transmitting devices 110-1, 110-2, through, 110-n. As illustrated transmitting device 110-1 may, at times, transmit at least one signal 111-1 that may be received and measured by apparatus 104 for position location purposes. Similarly, transmitting devices 110-2 through 110-n may each, at applicable time(s), transmit corresponding signals 111-2, through 111-n, each of which may be received and measured by apparatus 104 for position location purposes. In certain implementations, two or more of transmitting device 110-1, 110-2, ..., 110-*n* may be of the same or similar type(s) of device, for example, base station devices, access point devices, beacon devices, etc.

One or more other transmitting devices may be provided, for example, as represented by transmitting device 118 which may, at times, transmit one or more corresponding signals, represented by signal 119, that may be received and measured by apparatus 104 for position location purposes. Transmitting device 118 may or may not be part of wireless network 106, and may or may not comprise a same or similar device as one or more of the transmitting devices of wireless network 106.

As shown in FIG. 1, the various transmitting devices in wireless network environment 100 may be operatively coupled to or otherwise possibly interconnected by other devices and resources, represented by network(s) 112. In a particular example, network(s) 112 may comprise all or part of the Internet which may include or otherwise provide connectively to one or more computing platforms, as represented by other device(s) 114, and which may be configured to provide assistance data 116 relating to the transmission of one or more signals 111-1, ..., 111-*n*, 119. By way of an example, other device(s) 114 may comprise a location server. Assistance data 116 may be provided to mobile device 102 and used, at least in part, by apparatus 104 to determine a signal reception plan in accordance with one or more of the example techniques provided herein. As further illustrated, in certain implementations, signaling data 150 may be provided to one or more transmitting devices, for example, by other device(s) 114 (e.g., a location server) which may indicate to how a particular transmitting device is to transmit signals to mobile devices for use in position location estimation. For example, signaling data 150 may indicate frequency and timing information to transmitter device 118 with regard to signal 119. As described in greater detail herein, in certain implementations, signaling data 150 may be determined, e.g., by other device(s) 114 based, at least in part, on one or more indications of a signal measuring capability for mobile device 102. As such, in certain instances, all or part of assistance data 116 may correspond to all or part of signaling data 150, since both may be indicative of future signaling to support position location estimation of mobile device 102.

As further shown in FIG. 1, mobile device 102 may be configured to receive one or more satellite positioning system (SPS) signals 121 transmitted by one or more space vehicles (SVs) of one or more SPS 120. In certain instances, a position location estimate of mobile device 102 may be based, at least in part, on one or more measurements of one or more SPS signals 121. SPS 120 may comprise a Global Navigation Satellite System (GNSS), such as, e.g., Global Positing System (GPS), GLONASS, Galileo, Beidou, or other like satellite navigation system.

Although signals 111-1, ..., 111-*n* and 119 have been described as representing example downlink signals that may be used in position location estimation, it should also be understood that the same referenced wireless communication connections/links may similarly represent the transmission of other types of downlink or even uplink signals. Thus, for example, assistance data 116 may be requested and possibly received via signaling represented in part by signal 111-1 or signal 119.

Attention is drawn next to FIG. 2, which is a schematic block diagram illustrating some features of an example implementation of apparatus 104 that may be implemented mobile device 102, for example, as in FIG. 1. Apparatus 104 may be configured to receive signals, such as, for example, one or more of signals 111-1, ..., 111-*n*, or 119, for use in position location estimation.

As shown apparatus 104 may comprise a processing unit 202, a receiver 210, a memory 204, some or all of which may be interconnected via one or more connections 206. Processing unit 202 may comprise circuitry (possibly programmed circuitry), that may be configured to apply a signal reception plan 270 or the like to affect operation of receiver 210. In some implementations, processing unit 202 may determine all or part of signal reception plan 270 or the like based, at least in part, on received assistance data 250. In certain other implementations, however, received assistance data 250 may already comprise all or part of signal reception plan 270.

For illustration purposes, FIG. 2 shows that, at times, memory 204 may comprise data representing all or part of received assistance data 250, all or part of one or more indications of a signal measuring capability 260, and/or all or part of signal reception plan 270. Processing unit 202 may directly or indirectly access memory 204, e.g., to request data, provide data, retrieve/read data, store/write data, etc. In certain instances, data stored in memory may represent computer implementable instructions executable by processing unit 202, or possibly by other features of apparatus 104.

As shown in FIG. 2, a communication interface 208, in addition to comprising a receiver 210, may comprise a transmitter 212 for use in transmitting signals to one or more transmitting devices, or possibly to one or more other devices (e.g., directly or via a transmitting device). In certain example implementations, receiver 210 and transmitter 212 may be part of a transceiver or other like component. Communication interface 208 may directly or indirectly access memory 204, e.g., to request data, provide data, read data, write data, etc.

In certain implementations, communication interface 208 may be used by apparatus 104 to obtain at least a portion of received assistance data 250. In certain implementations, communication interface 208 may be used by apparatus 104 to provide one or more indications of signal measuring capability 260 to one or more other devices. As mentioned previously, one or more indications of signal measuring capability 260 may be based, at least in part, on one or more capabilities of receiver 210 to receive signals for use in position location estimation from one or more transmitting devices. By way of example, one or more indications of signal measuring capabilities may correspond to a tunable or otherwise applicable frequency band limitation (e.g., a maximum supported frequency band, a minimum frequency band) of RF front-end or other like portion (not shown) of receiver 210. In another possible example, one or more indications of signal measuring capabilities may correspond to a signal processing limitation corresponding to receiver 210, or some other portion of apparatus 104, e.g., a baseband processor (not shown) but which may be represented by processing unit 202, or the like. Here, for example, a signal processing limitation may relate to the maximum number of separate signals that may simultaneously, or over some defined period of time, be decoded or otherwise obtained from common signaling data captured by receiver 210 when operated in accordance with signal reception plan 270.

Figure 3:
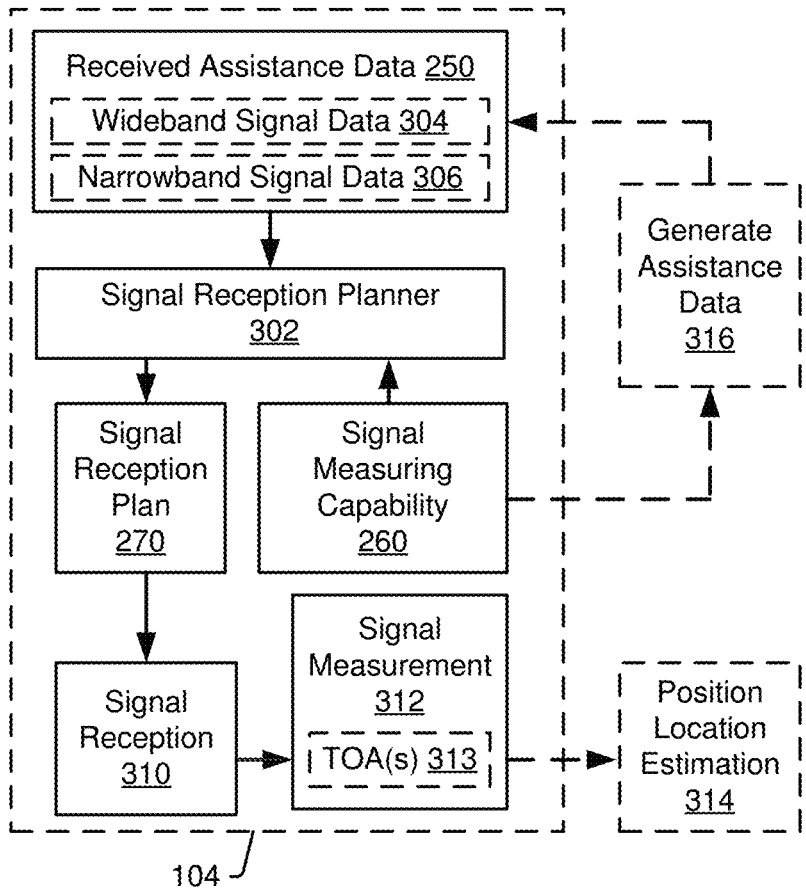
FIG. 3 is a schematic block diagram illustrating, in part, some functions that may be performed by an apparatus, for example, as in FIG. 2, to receive signals for use in position location estimation, in accordance with certain example implementations.

Attention is drawn next to FIG. 3, which is a schematic block diagram comprising functional diagram 300 which may be implemented, at least in part, by apparatus 104, in accordance with certain example implementations. Functional diagram 300 also corresponds, in part, to some functionality that may be implemented by one or more other devices external to apparatus 104, in accordance with certain example implementations.

In FIG. 3 an apparatus 104 (e.g., processing unit 202 or the like) may be configured as a signal reception planner 302. Signal reception planner 302 may access at least portion of received assistance data 250 and based, at least in part thereon, determine (e.g., calculate, generate, obtain, identify, etc.) all or part of signal reception plan 270. In certain implementations, signal reception planner 302 may be configured to determine a signal reception plan 270 based, at least in part, on one or more indications of signal measuring capability 260.

As illustrated in FIG. 3, in certain example implementations, received assistance data 250 may comprise wideband signal data 304 and narrowband signal data 306. Wideband signal data 304 may indicate, for example, that one or more transmitting devices (see, e.g., FIG. 1) are expected to transmit a particular (wideband) PRS during one or more measurement occasions. Narrowband signal data 306 may indicate, for example, that one or more transmitting devices (see, e.g., FIG. 1) are expected to transmit a particular (narrowband) PRS during one or more measurement occasions.

By way of example, wideband signal data 304 may indicate that a first transmitting device (e.g., a serving cell base station device, neighbor cell base station device, etc.) is expected to transmit a first PRS over a wideband PRS frequency band (e.g., a 20 MHz band centered at a particular frequency) during at least a first measurement occasion. Narrowband signal data 306 may, for example, indicate that a particular transmitting device, possibly the first transmitting device or a second transmitting device (e.g., a serving cell base station device, neighbor cell base station device, PRS beacon device, etc.) is expected to transmit a second PRS over a narrowband PRS frequency band (e.g., 1.4 MHz or possibly 5 MHz band centered at one or more specific frequencies) during at least a second measurement occasion. Accordingly, wideband signal data 304 and/or narrowband signal data 306 may include information indicating that a plurality of PRS or other like signals (for example, possibly CRS) are expected to be transmitted in the future.

Signal reception planner 302 may determine signal reception plan 270 based, at least in part, on information in received assistance data 250. For example, a signal reception planner 302 may determine whether there may be a reception window (e.g., a specific period of time in the future) wherein receiver 210 may possibly be configured to receive a wideband PRS and at least one narrowband PRS, and wherein at least a portion of the corresponding narrowband PRS frequency band is outside of the corresponding wideband PRS frequency band. Such a determination may be based, at least in part, on one or more indications of signal measuring capability 260.

By way of example, reception planner 302 may compare expected wideband PRS transmission timing and frequency information to like information for one or more narrowband PRS, and if such a comparison of timing and frequency information meets certain related criteria (e.g., indicated by one or more indications of signal measuring capability 260) then signal reception plan 270 may include timing and frequency related information for use in affecting operation of apparatus 104 to attempt to opportunistically receive and measure both the applicable wideband PRS and narrowband PRS during at least a portion of the specified period of time.

In an example implementation, one or more indications of signal measuring capability 260 may be indicative or otherwise based, at least in part, on a capability of apparatus 104 to receive and process signals relating to position location. Thus, apparatus 104 may be limited by frequency and frequency bandwidth limitations associated with receiver 210 (possibly resulting from and analog front end design, baseband processing design, antenna design, or other like limitations). By way of example, in certain implementations receiver 210 of apparatus 104 (see FIG. 2) may be tunable to a maximum frequency band (bandwidth) of 80 MHz or 100 MHz at certain center frequencies. In a similar manner, apparatus 104 may be limited by decoder or other like (baseband) processing limitations associated with receiver 210, other components (processing unit 202, memory 204, connections 206, etc.) to only being able to attempt to measure a certain number of signals (e.g., two PRS, three PRS, . . . , M number PRS, etc.). Such indications of signal measuring capabilities may be used to determine certain threshold or other criteria by signal reception planner 302. Of course, claimed subject matter is not intended to necessarily be limited by any of these examples.

As further illustrated in FIG. 3, signal reception plan 270 may be implemented in apparatus 104 to perform signal reception 310 and signal measurement 312. In signal reception 310, for example, receiver 210 may be (timely) tuned to a reception frequency band that encompasses a wideband PRS frequency band and also at least one narrowband PRS frequency band. Receiver 210 may be timely tuned to a reception frequency band in advance of a reception window, to coincide with a reception window, or possibly during a reception window. In certain implementations, all or part of signal reception 310 and all or part of signal measurement 312 may be performed by receiver 210 (see FIG. 2). All or part of signal measurement 312 may be performed by processing unit 202 (see FIG. 2), in certain implementations, which may represent a baseband processor or the like.

As further shown in FIG. 3, one or more of the measurements resulting from signal measurement 312 may be used for position location estimation. For example, one or more time of arrival (TOA(s)) 313 may be measured in signal measurement 312. In certain implementations, as previously mentioned, all or part of position location estimate 314 may be performed by mobile device 102, possibly by apparatus 104, using known techniques. In other implementations, all part of position location estimate 314 may be performed by one or more external devices (computing platforms).

FIG. 3 illustrates that, in certain implementations, one or more indications of signal measuring capability 260 may be provided to one or more external devices, e.g., possibly for use in generating assistance data 316. Thus, for example, a computing platform of other device(s) 114 (see FIG. 1) may specifically generate (or adjust/tailor), at least a portion of assistance data 116 based, at least in part, on one or more indications of signal measuring capability 260 for mobile device 102. An indication of signal measuring capability 260 for mobile device 102 may be obtained by other device(s) 114, for example, directly or indirectly from mobile device 102 (e.g., possibly as part of a position location related request message, as part of a handshake or other like process, in response to an inquiry, etc.). In some implementations, one or more indications of signal measuring capability for mobile device 102 may be determined by other device(s) 114, possibly based on other sources of information external to the mobile device. For example, other device(s) 114 may determine one or more indications of signal measuring capability for mobile device 102 based, at least in part, on a database comprising applicable profile/specification information for different models or types of mobile devices or components therein. As mentioned, in certain implementations, assistance data 116 (see FIG. 1) may, in certain implementations, comprise all or part of signal reception plan 270 which may reduce the complexity of processes of signal reception planner 302, or possibly even eliminate the need for a signal reception planner 302 in apparatus 104.

Figure 4:
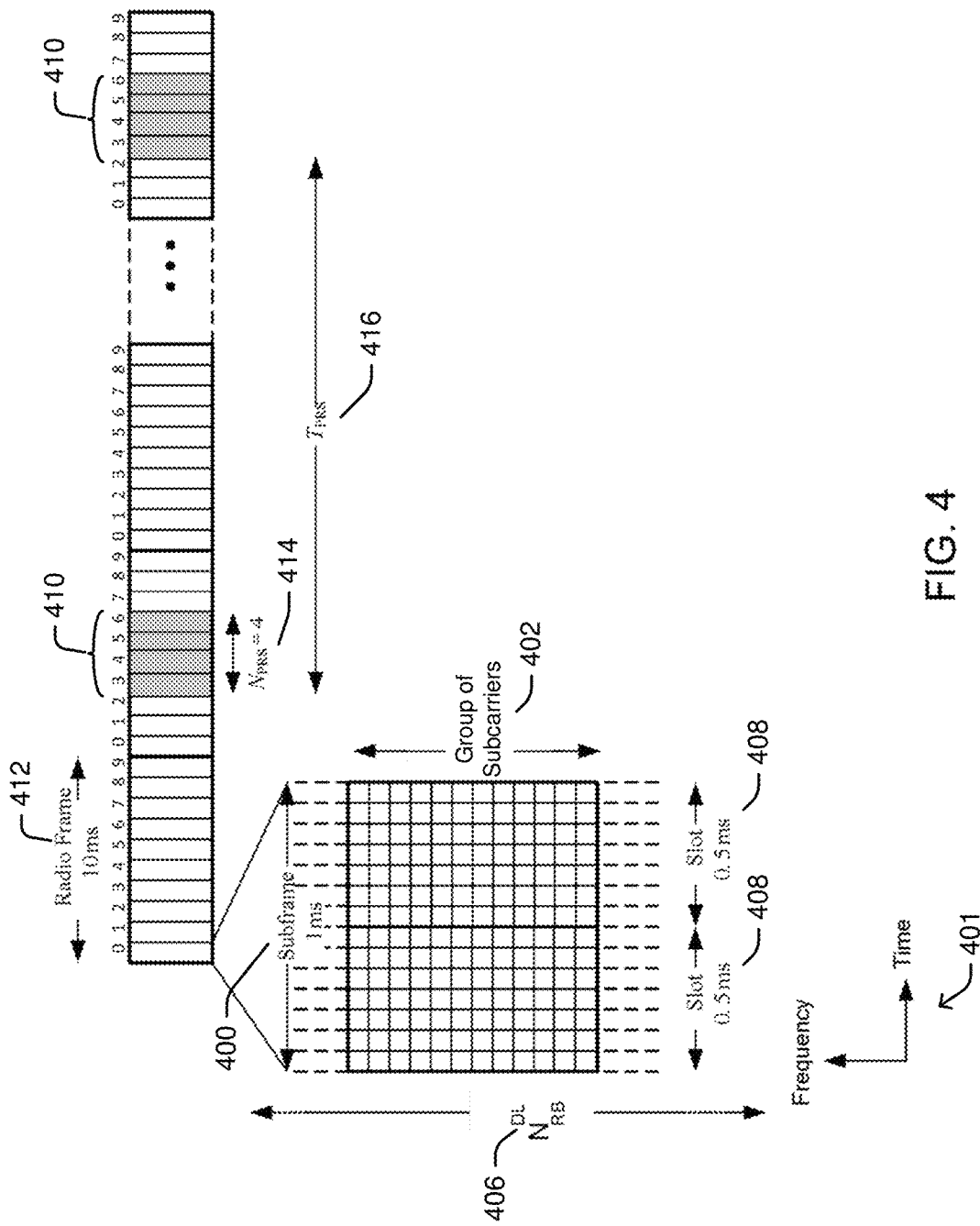
FIG. 4 is an illustrative diagram showing some known frequency and time features relating to a positioning reference signal (PRS) that may be transmitted by a transmitting device and received by a mobile device, for example, as in FIG. 1, in accordance with an example implementation.

Attention in drawn next to FIG. 4, which is an illustrative diagram showing portions of a structure of an exemplary LTE subframe sequence with PRS positioning occasions 410, with expanded details of a subframe portion 400 showing an example group of subcarriers 402 with respect to a signal frequency and time per reference key 401.

More specifically, as shown in FIG. 4, time is represented horizontally (e.g. on an X axis) with time increasing from left to right, while frequency is represented vertically (e.g. on a Y axis) with frequency increasing (or decreasing) from bottom to top. As shown in FIG. 4, LTE Radio Frames 412 are of 10 ms duration each. For downlink Frequency Division Duplex (FDD) mode, Radio Frames 412 are organized into ten subframes of 1 ms duration each. Each subframe portion 400 comprises two slots 408, each of 0.5 ms duration.

In the frequency domain, the available bandwidth of the frequency band may be divided into uniformly spaced orthogonal subcarriers 402. For example, for a normal length cyclic prefix using 15 KHz spacing, subcarriers 402 may be grouped into a group of twelve subcarriers. Each grouping, which comprises twelve subcarriers 402, in FIG. 4, may represent a resource block (RB) and, in the example above, the number of subcarriers in the resource block may be written as $N_{SC}^{RB}=12$. For a given channel bandwidth 406, the number of available resource blocks may be indicated as $N_{RB}^{DL}$. For example, for a 3 MHz channel bandwidth in the above example, the number of available resource blocks on each channel is given by $N_{RB}^{DL}=15$.

In an example LTE wireless network, a transmitting device such as a base station device (e.g., an Evolved Node B (eNB)) may transmit a PRS (e.g., a downlink PRS), during PRS positioning occasion(s) 410 as illustrated in FIG. 4, which may be measured and used for mobile device 102 position location estimation. Since transmission of a PRS by a transmitting device may be directed to all mobile devices within radio range, the transmitting device may also be considered to "broadcast" a PRS. A transmitting device that does not support all the normal transceiver functions of a base station device (e.g., an eNB) but that transmits (or broadcasts) a PRS may comprise a terrestrial beacon system (TBS) beacon, a TBS transmission point (TP), a PRS-only TP, a positioning beacon, a positioning only beacon, a PRS only beacon, an eNB beacon, a standalone eNB beacon, or a Radio Access Network (RAN) beacon, just to name a few examples. As such, in certain implementations, a transmitting device may comprise applicable devices in a RAN that transmit PRS to assist in mobile device position location estimation and which may or may not support other functions such as providing wireless access (e.g. for voice and data connectivity) to one or more UEs. Thus, for example, a transmitting device may correspond to a base station device such as, for example, an eNB, or possibly an eNB beacon, a standalone eNB beacon, or some other applicable type of positioning beacon. In some embodiments, a transmitting device may provide additional LTE/PRS coverage for indoor locations, for example, to support functions of an eNB or of a remote radio head for an eNB. In some embodiments, a transmitting device may act as a standalone beacon that may transmit a PRS and may also transmit information needed to support mobile device acquisition and measurement of the PRS such as an LTE master information block (MIB) and one or more LTE system information blocks (SIBs) but may not transmit or receive data or control information to support normal LTE access by mobile devices (e.g., may not support wireless access by mobile devices for the purpose of sending and receiving voice and data).

A PRS, which in certain implementations, may be defined (for example) in 3GPP Long Term Evolution (LTE) Release-9 and later releases, may be transmitted by a transmitting device after appropriate configuration by a Transmission Point Controller (TPC) and/or an O&M server. A PRS may be transmitted in special positioning subframes that are grouped into positioning occasions 410. For example, in LTE, a PRS positioning occasion can comprise a number $N_{PRS}$ 414 of consecutive positioning subframes where the number $N_{PRS}$ may be between 1 and 160 (e.g. may include the values 1, 2, 4 and 6 as well as other values). The PRS positioning occasions for a transmitting device may occur periodically at intervals, denoted by a number $T_{PRS}$, of millisecond (or subframe) intervals where $T_{PRS}$ may equal 5, 10, 20, 40, 80, 160, 320, 640, or 1280. As an example, FIG. 4 illustrates a periodicity of positioning occasions where $N_{PRS}$ 414 equals four and $T_{PRS}$ 416 is greater than or equal to twenty. In some embodiments, $T_{PRS}$ may be measured in terms of a number of subframes between the start of consecutive positioning occasions 410.

Within each positioning occasion, a PRS may be transmitted with a constant power. A PRS may also, in certain instances, be transmitted with zero power (e.g., muted). Muting, which essentially turns off a regularly scheduled PRS transmission, may be useful when PRSs between different cells overlap by occurring at the same or almost the same time. In this case, PRS from some cells may be muted while PRSs from other cells are transmitted (e.g. at a constant power). Muting may aid signal acquisition and Reference Signal Time Difference (RSTD) measurement by a mobile device for PRSs that are not muted by avoiding interference from PRSs that have been muted. Muting may be viewed as the non-transmission of a PRS for a given positioning occasion for a particular cell or transmitting device. Muting patterns may be identified using bit strings. For example, in a bit string signaling a muting pattern, if a bit at position j is set to "0", then a mobile device may infer that the PRS is muted for a $j^{th}$ positioning occasion. Hence, a signal reception plan 270 (see, FIGS. 2 and 3) may be based, at least in part, on one or more muting patterns, or other like information.

To further possibly improve acquisition of PRS, positioning subframes may be low-interference subframes that are transmitted without user data channels. As a result, in ideally synchronized networks, PRSs may receive interference from other cell PRSs with the same PRS pattern index (i.e., with the same frequency shift), but not from data transmissions. A frequency shift, in LTE, for example, is defined as a function of a PRS ID for a cell or TP (denoted as $N_{ID}^{PRS}$) or as a function of a Physical Cell Identifier (PCI) (denoted as $N_{ID}^{cell}$) if no PRS ID is assigned, which results in an effective frequency re-use factor of six.

To possibly improve acquisition of a PRS further (e.g. when PRS bandwidth is limited such as with only six resource blocks corresponding to a (relatively) narrowband of 1.4 MHz), the frequency band for consecutive PRS positioning occasions (or consecutive PRS subframes) may be changed in a known and predictable manner via a frequency hopping scheme. In addition, a transmitting device may in certain implementations support more than one PRS configuration, where each PRS configuration comprises a distinct sequence of PRS positioning occasions with a particular number of subframes ($N_{PRS}$) per positioning occasion and a particular periodicity ($T_{PRS}$). Thus, for example, a given transmitting device may be configured to transmit one or more wideband PRS and one or more narrowband PRS.

Assistance data 116 (see FIG. 1) may be provided to mobile device 102 by other device(s) 114 (e.g., a location server, Enhanced Serving Mobile Location Center (E-SMLC), etc.), and may relate to a "reference cell" and one or more "neighbor cells" or "neighboring cells" relative to the "reference cell". For example, in certain implementations, received assistance data may provide the center channel frequency of each cell, various PRS configuration parameters (e.g. $N_{PRS}$, $T_{PRS}$, muting sequence, frequency hopping sequence, PRS ID, PRS bandwidth), a cell global ID and/or other cell related parameters applicable to OTDOA. In the case of a transmitting device (e.g., an eNB) that acts as a positioning only beacon, a neighbor cell or reference cell may be equated to the eNB with the same or similar assistance data being provided.

PRS positioning by a mobile device may be facilitated, for example, by including the serving cell for the mobile device in the assistance data (e.g., with the reference cell indicated as being the serving cell). Assistance data may also include "expected RSTD" parameters, which provide the mobile device with information about the RSTD values the mobile device is expected to measure at its current location between the reference cell and each neighbor cell together with an uncertainty of the expected RSTD parameter. The expected RSTD together with the uncertainty define a search window for the mobile device within which the mobile device is expected to measure the RSTD value. Assistance data may also include PRS configuration information parameters, which may allow a mobile device to determine when a PRS positioning occasion occurs on signals received from various neighbor cells relative to PRS positioning occasions for the reference cell, and to determine the PRS sequence transmitted from various cells in order to measure a signal Time of Arrival (TOA) or RSTD. Thus, in certain implementations, a signal reception plan 270 (see FIG. 2) may be based, at least in part, on information relating to expected PRS positioning occasions, or the like.

Using the RSTD measurements, the known absolute or relative transmission timing of each cell, and the known position(s) of a transmitting device's physical transmitting antennas for the reference and neighboring cells, mobile device's position location estimate may be calculated. For example, an RSTD for a cell "k" relative to a reference cell "Ref", may be given as ($TOA_k$-$TOA_{Ref}$). TOA measurements for different cells may then be converted to RSTD measurements (e.g. as defined in 3GPP TS 36.214) and sent to a location server (e.g. E-SMLC) by a mobile device. Using (i) the RSTD measurements, (ii) the known absolute or relative transmission timing of each cell, and (iii) the known position(s) of the transmitting device's physical transmitting antennas for the reference and neighboring cells, a mobile device position location estimation may be determined.

Figure 5A:
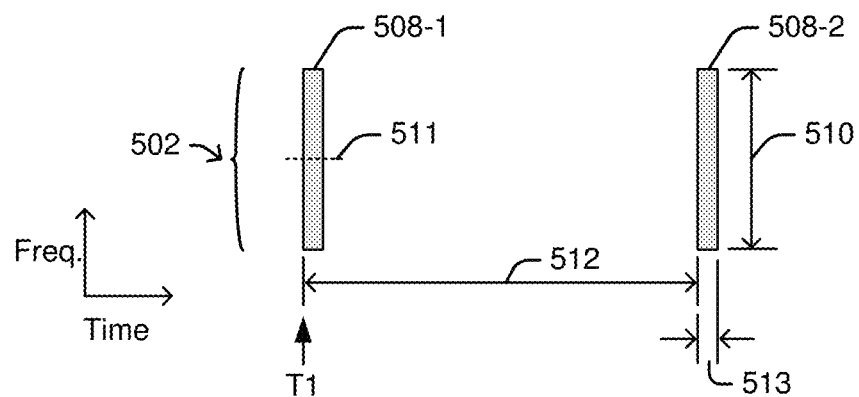
FIG. 5A is a timeline diagram illustrating transmission of a first signal, for example, a PRS transmitted over a wideband PRS frequency band, in accordance with an example implementation.
Figure 5B:
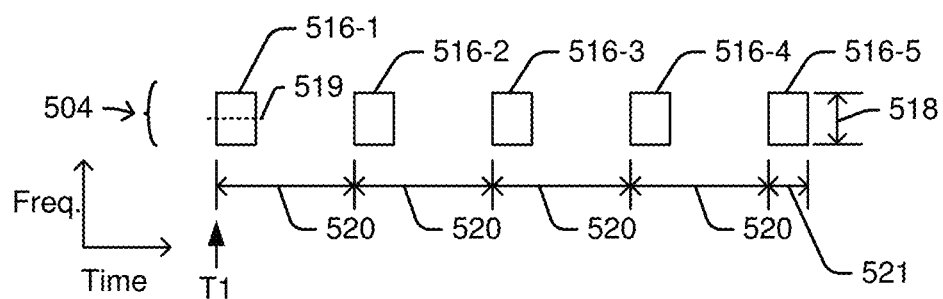
FIG. 5B is a timeline diagram illustrating transmission of a second signal, for example, a PRS transmitted over a narrowband PRS frequency band, in accordance with an example implementation.
Figure 5C:
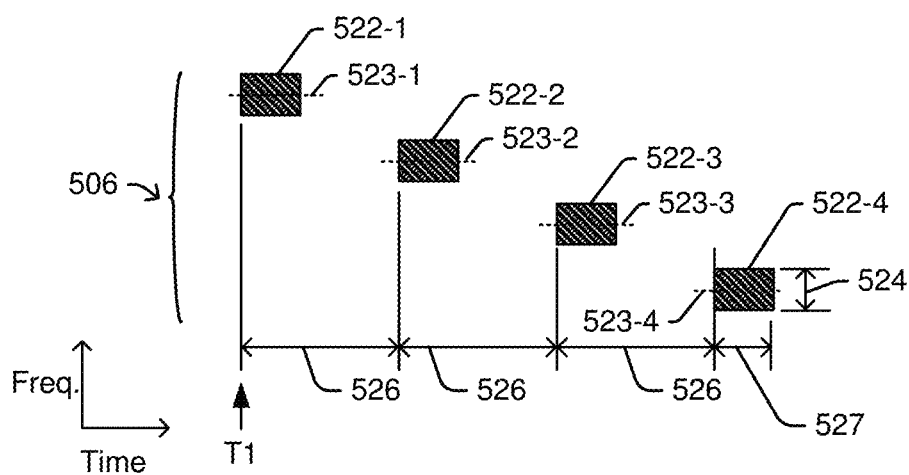
FIG. 5C is a timeline diagram illustrating transmission of a second signal, for example, a PRS transmitted over a plurality of narrowband PRS frequency bands according to a frequency hopping scheme, in accordance with yet another example implementation.

Attention is drawn next to FIGS. 5A, 5B and 5C, which are timeline diagrams illustrating periodic transmissions of signals, such as, for example, PRSs, in accordance with some example implementations. It should be recognized that the scale of the example signals illustrated in FIGS. 5A, 5B and 5C, and also FIG. 6, with regard to time and frequency are not intended to be accurate nor limit claimed subject matter.

With this in mind, FIG. 5A is a timeline diagram illustrating transmission of a first signal 502, for example, a PRS transmitted over a wideband PRS frequency band 510 with a center frequency 511. As shown, first signal 502 may comprise a plurality of transmissions 508 (e.g., at applicable, periodic positioning occasions), each with a duration 513, and periodically separated by time 512, e.g., with reference to example time T1. By way of example only, wideband PRS frequency band 510 may be 20 MHz, time 512 may be 160 ms, and duration 513 may correspond to one subframe.

FIG. 5B is a timeline diagram illustrating transmission of a second signal 504, for example, a PRS transmitted over a narrowband PRS frequency band 518 with a center frequency 519. As shown, second signal 504 may comprise a plurality of transmissions 516, each with a duration 521, and periodically separated by time 520, e.g., with reference to example time T1. By way of example only, narrowband PRS frequency band 518 may be 5 MHz, time 520 may be 40 ms, and duration 521 may correspond to two subframes.

FIG. 5C is a timeline diagram illustrating transmission of yet another example second signal 506, for example, a PRS transmitted in accordance with a frequency hopping scheme using a narrowband PRS frequency band 524. For example, transmissions 522-1, 522-2, 522-3, and 522-4 are illustrated as each having a narrowband PRS frequency band centered, respectively, at center frequencies 523-1, 523-2, 523-3, and 523-4. As shown, transmissions 522-1, 522-2, 522-3, and 522-4 each have a duration 527 and are periodically separated by time 526, e.g., with reference to example time T1. By way of example only, narrowband PRS frequency band 524 may be 1.4 MHz, time 526 may be 80 ms, and duration 527 may correspond to four subframes.

Time T1, as shown in FIGS. 5A, 5B and 5C, is intended simply to represent that the transmissions of first signal 502 and second signals (504, 506) may, in some implementations, be synchronized or otherwise temporally related in a known or determinable manner (e.g., each may have a particular offset from a specific point in time or specific point in a transmission sequence, etc.).

Figure 6:
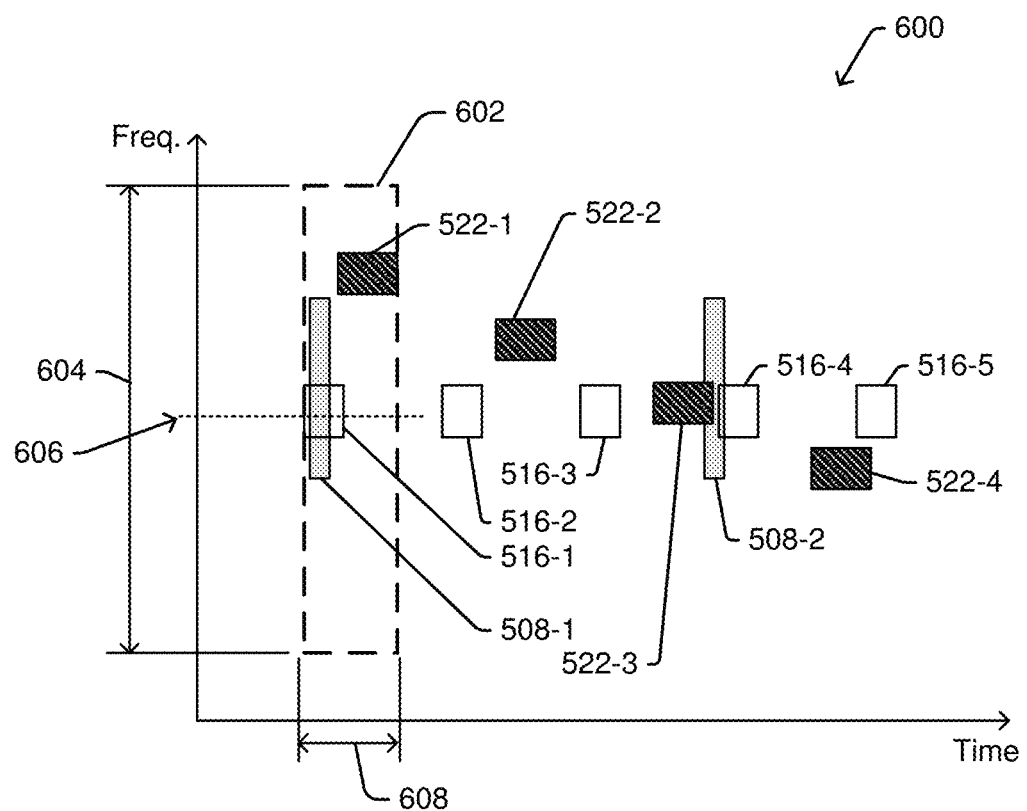
FIG. 6 is a timeline diagram illustrating mobile device reception of multiple signals, for example, PRS as in FIGS. 5A-C, within a reception frequency band during a reception window, in accordance with an example implementation.

Turning next to FIG. 6, an example graph 600 is shown which illustrates mobile device reception of multiple transmitted signals, for example, a (wideband) first signal 502, a (narrowband) second signal 504 and a (narrowband, frequency hopping) second signal 506, e.g., as presented in FIGS. 5A, 5B AND 5C, respectively. While several signals are shown in graph 600 relative to one another and to time (X axis) and frequency (Y axis), it should be understood that this depiction of the signals is illustrative only and not drawn to scale. Graph 600 is presented simply to show that a mobile device 102 (see, FIG. 1) may, under certain conditions, be configured to opportunistically receive two or more signals during a reception window over a reception frequency band.

With this in mind, wideband first signal 502 (comprising transmissions 508-1 and 508-2), narrowband second signal 504 (comprising transmissions 516-1 through 516-5) and narrowband frequency hopping second signal 506 (comprising transmissions 522-1 through 522-4) are illustrated as having been transmitted by different transmitting devices. As such these example signals, as illustrated, may arrive at the mobile device at different times, e.g., due to differences in transmitting device location, time of flight, etc.

As shown in graph 600, there may be some frequency overlap in such signals, as well as some time overlap. In graph 600, as shown by example (dashed line) region 602, there is at least partial frequency overlap between wideband signal transmission 508-1 and narrowband signal transmission 516-1. Also, as shown in region 602, there is at least some time overlap between wideband transmission 508-1 and narrowband transmission 516-1, and some time overlap between narrowband transmission 516-1 and narrowband transmission 522-1.

As may be appreciated, region 602 in FIG. 6 may correspond to a reception frequency band 604 with a center frequency 606, and a reception window 608. As mentioned, a signal reception plan 270 (see FIGS. 2 and 3) may be applied to a receiver 210 to opportunistically receive and measure signals, for example, such as, possibly at least partially time and frequency overlapping wideband and narrowband PRS signals. Thus, in certain implementations, a signal reception plan 270 may indicate at least one reception frequency band 604 and at least one center frequency 606, or possibly other like information. Likewise, an example signal reception plan 270 may indicate at least one corresponding reception window 608 or possibly other like information.

Although region 602 is shown as having a reception frequency band 604 that extends (at both higher and lower boundaries) beyond the various transmission signal bandwidths it encompasses, in other instances one or both such frequency boundaries may align with an applicable boundary of at least one of the signal transmissions being encompassed. Similarly, although region 602 is shown as having a reception window 608 that occurs earlier and runs longer than the corresponding boundaries of the various transmission signal durations being encompassed, in other instances one or both such time boundaries may align with an applicable time boundary of at least one of the signal transmissions being encompassed. Furthermore, although region 602 is shown encompassing individual transmissions (e.g., single measurement occasions) 508-1, 516-1 and 522-1, it should be understood that in certain instances, a reception window 608 may be increased to encompass a plurality of transmissions (e.g., two or more measurement occasions) for at least one of the signals. Further, it should be understood that region 602 may in certain instances be set to have one or more frequency related boundaries, one or more time related boundaries, or some combination of such boundaries that may or may not be aligned to similar frequency/time boundaries corresponding to the encompassed signal transmissions.

Reference is made next to FIG. 7A, which is a block diagram illustrating a process 700 that may be performed, at least in part, by a mobile device 102 or apparatus 104 provided therein (see FIG. 1) to receive signals for use in position location estimation, in accordance with certain example implementations.

At example block 701, assistance data 250 may be received, e.g., by mobile device 102 or apparatus 104, from one or more devices. Received assistance data 250 may be indicative of a plurality of signals that are expected to be transmitted by one or more transmitting devices. By way of some examples, assistance data 250 may indicate that certain PRS, CRS, or other like signals may be received for possible use in position location.

At example block 702, all of a part of a signal reception plan 270 or the like may be generated or otherwise identified, for example, based, at least in part, on received assistance data 250 (see FIGS. 2 and 3). Hence, example block 702 may comprise identifying at least a first signal to be transmitted over a first frequency band and a second signal to be transmitted over a second frequency band during a reception window 608 (see FIG. 6), wherein the second frequency band is narrower than the first frequency band and at least a portion of the second frequency band is outside of the first frequency band. Example block 702 may generate or otherwise identify all of a part of a signal reception plan 270 or the like further based, at least in part, on one or more indications of signal measuring capability 260 associated with mobile device 102.

At example block 704, mobile device 102 or apparatus 104 may implement or otherwise apply at least a portion of the signal reception plan 270 to subsequently receive at least the first signal and the second signal via a receiver 210 tuned to a reception frequency band that encompasses at least the first frequency band and the second frequency band.

At example block 706, mobile device 102 or apparatus 104 may measure a first time of arrival corresponding to reception of the first signal and a second time of arrival of corresponding to reception of the second signal.

At example block 708, mobile device 102 or apparatus 104 may obtain a location position that may be based, at least in part, on one or more of the measured times of arrival, e.g., from block 706.

Reference is made next to FIG. 7B, which is a block diagram illustrating a process 720 that may be performed, at least in part, by a mobile device 102 or apparatus 104 provided therein (see FIG. 1) to receive signals for use in position location estimation, in accordance with certain example implementations.

Although only two signals are described in processes 700, it should be understood that the process may be applied to three or more signals, possibly including various mixtures of "wideband" signals and "narrowband" signals. For example, region 602 in FIG. 6 illustrates potential reception of three signal transmissions encompassed by example region 602.

As illustrated, process 720 may comprise example blocks 701, 702, 704, and 706 of process 700 as described in the preceding example. Process 720 may further comprise, shown herein as part of example block 708, one of more of example blocks 709 and 710. Also, as illustrated, process 720 may include example block 712 in certain implementations.

In example block 709 (which may be implemented as part of block 708, for example), mobile device 102 or apparatus 104 may transmit a signal to at least one other device, the signal being indicative of the first time of arrival measurement, the second time of arrival measurement, or both (e.g., as measured in example block 706.

At example block 710 (which may be implemented as part of block 708, for example), mobile device 102 or apparatus 104 may obtain via reception a position location of the mobile device, wherein the position location is based, at least in part, on the first time of arrival measurement, the second time of arrival measurement, or both. Thus, for example, in certain instances, in process 700 of FIG. 7A as part of example block 708, a position location may be obtained by determining such onboard mobile device 102 or apparatus 104. In other instances, example block 710 all or part of such position location determinations may be performed by one or more devices external to mobile device 102, for example, based on the transmitted signal(s) from example block 709 and received by mobile device 102 or apparatus 104. In still other instances, as part of example block 708, position location determinations may be performed in-part by mobile device 102 or apparatus 104, and in-part by one or more other devices external to mobile device 102.

At example block 712, a mobile device 102 or apparatus 104 may transmit an indication of signal measuring capability 260 of the mobile device to one or more other devices 114 (see FIGS. 1-3). As shown in example processes 900 and 920 in FIGS. 9A and 9B, respectively, an indication of signal measuring capability 260 of a mobile device may be used, at least in part, to possibly generate assistance data 116 or possibly generate signaling data 150 (see FIG. 1).

Figure 8:
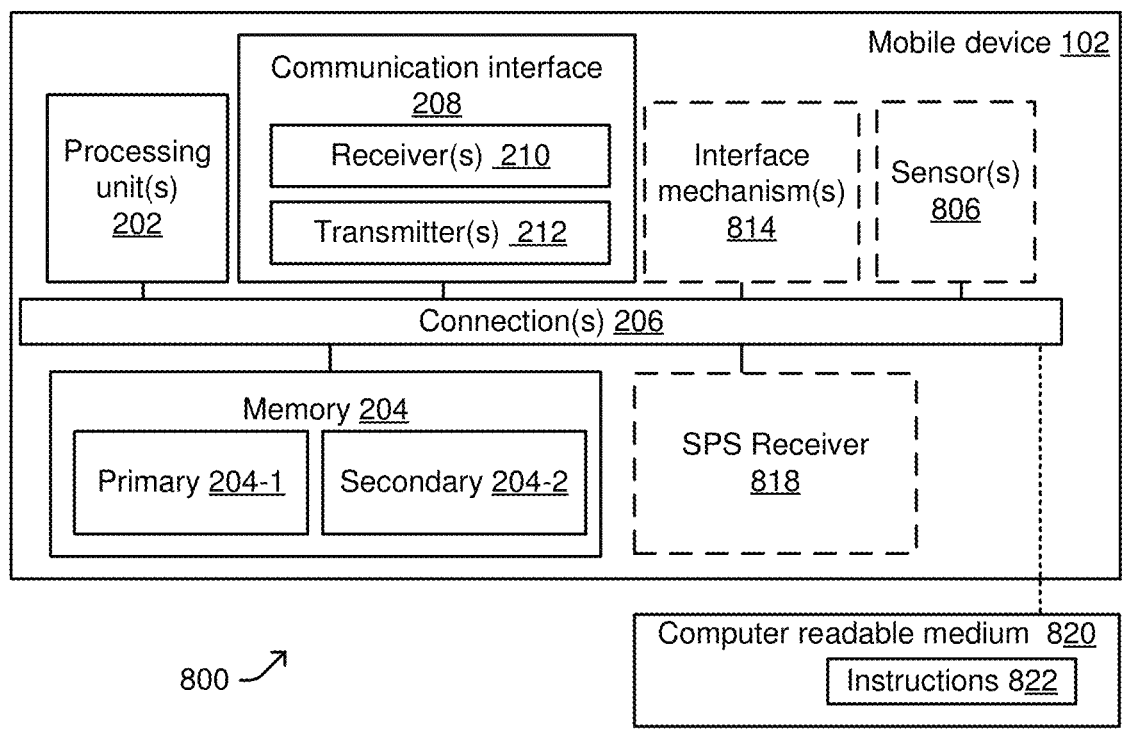
FIG. 8 is a block diagram illustrating some features of a mobile device, in accordance with certain example implementations.

Attention is drawn next to FIG. 8, which is a schematic diagram illustrating certain features of a portable electronic device 800 comprising mobile device 102. It should be understood that the example features shown in portable electronic device 800 are not intended to show an exhaustive list of features that may be provided within a mobile device.

As illustrated, mobile device 102 may comprise one or more processing units 202 (e.g., to perform data processing in accordance with certain techniques provided herein) coupled to memory 204 via one or more connections 206 (e.g., one or more electrical conductors, one or more electrically conductive paths, one or more buses, one or more fiber-optic paths, one or more circuits, one or more buffers, one or more transmitters, one or more receivers, etc.). Processing unit(s) 202 may, for example, be implemented in hardware or a combination of hardware and software. Processing unit(s) 202 may be representative of one or more circuits configurable to perform at least a portion of a data computing procedure or process, including but not limited to processing of received assistance data, generating and/or applying a signal reception plan or the like with respect to at least one receiver, determining one or more indications of measuring capabilities, processing received signal data, initiating signal transmissions, accessing memory, executing instructions, estimating a position location, etc. By way of example but not limitation, a processing unit may include some form of a system-on-a-chip (SOC), one or more processors, controllers, microprocessors, microcontrollers, application specific integrated circuits, digital signal processors, programmable logic devices, field programmable gate arrays, or the like, or any combination thereof. Processing unit(s) 202 may include but are not limited to general application processors and dedicated sensor processor(s). Processing unit(s) 202 may receive and analyze sensor measurements and initiate transmission and reception of data messages, control messages, measurements, etc., through communication interface 208 or through interface mechanisms 814. Processing unit(s) 202 may initiate the activation, de-activation and/or solicitation of various (optional) sensors 806 on mobile device 102.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. Memory 204 may store data representing various information (e.g., values, measurements), or various instructions, or the like. While illustrated in this example as being separate from the processing units, it should be understood that all or part of a primary memory may be provided within or otherwise co-located and coupled with a processing unit 202 or other like circuitry within the mobile device. Secondary memory 204-2 may comprise, for example, the same or similar type of memory as primary memory and/or one or more data storage devices or systems, such as, for example, a solid motion state memory drive, etc. In certain implementations, secondary memory may be operatively receptive of, or otherwise configurable to couple to, a non-transitory computer readable medium 820. Memory 204 and/or non-transitory computer readable medium 820 may comprise, for example, instructions 822 for use in performing data processing, e.g., in accordance with the applicable techniques as provided herein.

Communication interface 208 may, for example, comprise one or more wired and/or wireless network interface units, radios, modems, etc., represented here by one or more receivers 210 and one or more transmitters 212. It should be understood that in certain implementations, communication interface 208 may comprise one or more transceivers, and/or the like. Further, it should be understood that although not shown, communication interface 208 may comprise one or more antennas and/or other circuitry as may be applicable given the communication interface capability.

In accordance with certain example implementations, communication interface 208 may, for example, be enabled for use with various wired communication networks, e.g., such as telephone system, a local area network, wired or wireless, an object or body-based network such as a network of Bluetooth or other short range transceivers connected to the body, a wide area network, a personal area network, an intranet, the Internet, etc.

In accordance with certain example implementations, communication interface 208 may, for example, be enabled for use with various wireless communication networks such as a wireless wide area network (WWAN), a wireless local area network (WLAN), a wireless personal area network (WPAN), an object or body-based network, (such as a local Bluetooth network), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include generational family technologies (e.g., "4G", "5G", etc.), such as, for example, Long Term Evolution (LTE), Advanced LTE, WiMAX, Ultra Mobile Broadband (UMB), and/or the like. Additionally, communication interface(s) 208 may further provide for infrared-based communications with one or more other devices. A WLAN may, for example, comprise an IEEE 802.11x network, and a WPAN may comprise a Bluetooth network, an IEEE 802.15x, for example. A WPAN may be used to interconnect multiple mobile devices on the same person or in the nearby environment, such as those utilized to communicate between various mobile devices on a person or object to send and receive sensor data, commands, battery indications and other mobile device information and/or commands. Wireless communication implementations described herein may also be used in connection with any combination of WWAN, WLAN or WPAN.

Representative interface mechanism 814 may, for example, comprise one or more input and/or output units that may be used to obtain inputs from and/or provide outputs to one or more other devices and/or a user. Thus, for example, interface mechanism 814 may comprise various buttons, switches, a touch pad, a trackball, a joystick, a touch screen, a keyboard, a microphone, a camera, an eye tracker, and/or the like, which may be used to receive one or more user inputs. In certain instances, interface mechanism 814 may comprise various devices that may be used in producing a visual output, an audible output, and/or a tactile output for a user. For example, interface mechanism 814 may be used to present a video display, graphical user interface, positioning and/or navigation related information, visual representations of electronic map, routing directions, etc., via a display mechanism and/or audio mechanism.

Representative sensor(s) 806 may represent one or more environmental sensors, such as, e.g., a magnetometer or compass, a barometer or altimeter, etc., and which may be useful for positioning and/or determining a certain movements. For example, sensor(s) 806 may represent one or more inertial sensors, which may be useful in detecting certain movements. Thus, for example, sensor(s) 806 may comprise one or more accelerometers, one or one or more gyroscopes. In some implementations sensor(s) 806 may comprise and/or take the form of one or more input devices such as a sound transducer, a microphone, a camera, a light sensor, etc.

In certain instances, sensor(s) 806 may generate analog or digital signals that may be stored in memory 204 and processed by DPS(s) (not shown) or processing unit(s) 202 in support of one or more applications such as, for example, applications directed to positioning or navigation operations based, at least in part, on one or more positioning functions.

In certain instances, mobile device 102 may comprise a satellite positioning system (SPS) receiver 818 for acquiring SPS signals 121 (see FIG. 1) via one or more antennas (not shown). SPS receiver 818 may also process, in whole or in part, acquired SPS signals 121 for estimating a position location and/or a motion of the mobile device. In certain instances, SPS receiver 818 may comprise one or more processing unit(s) (not shown), e.g., one or more general purpose processors, one or more digital signal processors DSP(s), one or more specialized processors that may also be utilized to process acquired SPS signals, in whole or in part, and/or calculate an estimated location of the mobile device. In certain implementations, all or part of such processing of acquired SPS signals may be performed by other processing capabilities in a mobile device, e.g., processing unit(s) 202, memory 204, etc., in conjunction with SPS receiver 818. Storage of SPS or other signals for use in performing position location may be performed in memory 204 or registers (not shown).

Processing unit(s) 202 or communication interface 208 may comprise a dedicated modem processor or the like that may be capable of performing baseband processing of signals acquired and down converted at receiver(s) 210 of communication interface 208 or SPS receiver 818. Similarly, a modem processor or the like may perform baseband processing of signals to be up converted for transmission by (wireless) transmitter(s) 212. In alternative implementations, instead of having a dedicated modem processor, baseband processing may be performed by a general purpose processor or DSP (e.g., general purpose and/or application processor). It should be understood, however, that these are merely examples of structures that may perform baseband processing, and that claimed subject matter is not limited in this respect. Moreover, it should be understood that the example techniques provided herein may be adapted for a variety of different electronic devices, mobile devices, transmitting devices, environments, position fix modes, etc.

Figure 9A:
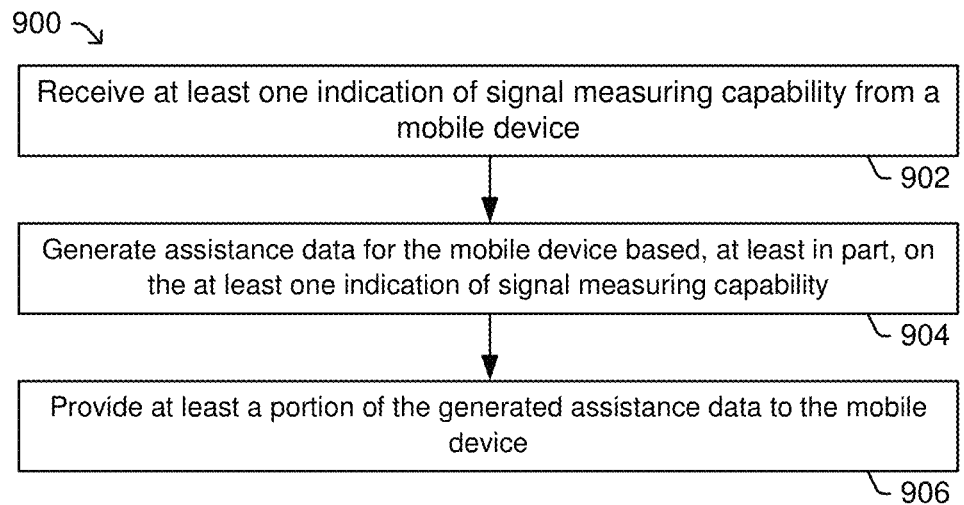
FIG. 9A is a block diagram illustrating a process that may be implemented, at least in part, by one or more computing platforms of a wireless network environment, for example, as in FIG. 1, to provide assistance data to a mobile device for use in receiving signals for position location estimation, in accordance with certain example implementations.

Attention is drawn next to FIG. 9A, which is a block diagram illustrating a process 900 that may be implemented, at least in part, by one or more computing platforms supportive of a wireless network environment, for example, as may be provided, at least in part, by one or more other devices(s) 114 in FIG. 1. Process 900 may be implemented to generate/provide assistance data 116 to a mobile device 102 (see FIGS. 1-3) for use in receiving signals for position location estimation, in accordance with certain example implementations.

At example block 902, a computing platform may receive at least one indication of signal measuring capability from a mobile device. For example, an apparatus 104 in mobile device 102 may provide one or more indications of signal measuring capability 260 (see, FIGS. 2 and 3) to other device(s) 114 (FIG. 1). By way of further example, an indication of signal measuring capability may correspond to a maximum reception frequency band supported by receiver of the mobile device. In another example, an indication of signal measuring capability may correspond to a maximum number of signals that a receiver or other component of the mobile device may be able to simultaneously process (e.g., decode, measure, etc.), process within some defined period of time, possibly as data store in memory, etc. In yet another example, an indication of signal measuring capability may correspond to maximum reception window value or the like. In certain implementations, a computing platform may receive one or more indications of signal measuring capability for the mobile device from one or more other devices. For example, a database or other repository or possibly service resource may provide one more indications of signal measuring capability for a specific mobile device, a specific apparatus within a mobile device, a specific class of mobile devices, etc., that may have been previously determined or otherwise identified in some manner.

At example block 904, a computing platform may generate assistance data for the mobile device based, at least in part, on one or more indications of signal measuring capability. For example, assistance data may indicate that certain transmitting devices should be transmitting certain signals, and which may therefore be of potential use by mobile device 102 or apparatus 104 in generating or otherwise identifying all or part of signal reception plan 270 (see FIGS. 2 and 3) or the like. In certain implementations, assistance data 116 may comprise all or part of signal reception plan 270 (see FIGS. 2 and 3) or the like. At example block 906, a computing platform may provide at least a portion of the assistance data (generated at least in part at example block 904) to the mobile device.

Figure 9B:
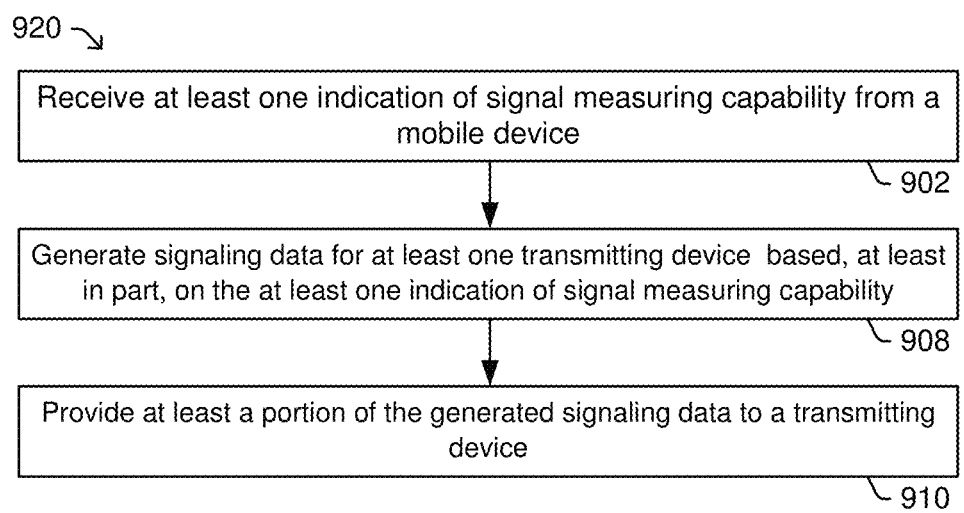
FIG. 9B is a block diagram illustrating a process that may be implemented, at least in part, by one or more computing platforms of a wireless network environment, for example, as in FIG. 1, to provide signaling data to one or more transmitting devices for use in transmitting signals for position location estimation, in accordance with certain example implementations.

Attention is drawn next to FIG. 9B, which is a block diagram illustrating a process 920 that may be implemented, at least in part, by one or more computing platforms supportive of a wireless network environment, for example, as may be provided, at least in part, by one or more other devices(s) 114 in FIG. 1. Process 920 may be implemented to generate/provide signaling data 150 (see FIG. 1) to at least one transmitting device for use in scheduling transmission of signals for position location estimation, in accordance with certain example implementations.

As shown, process 920 may comprise example block 902 as described, for example, in the preceding description with regard to process 900. In example block 902, a computing platform may receive at least one indication of signal measuring capability from a mobile device. For example, an apparatus 104 in mobile device 102 may provide one or more indications of signal measuring capability 260 (see, FIGS. 2 and 3) to other device(s) 114 (FIG. 1).

In example block 908, a computing platform may generate signaling data 150 (e.g., a schedule, plan, instruction, scheme, etc.) (see FIG. 1) for one or more transmitting devices based, at least in part, on one or more indications of signal measuring capability for at least one mobile device (e.g., as per example block 902). For example, signaling data 150 may indicate a PRS configuration or otherwise provide information indicative of one or more future signal transmissions from the transmitting device, possibly to include a muting pattern, etc. Hence, signaling data 150 may be used to coordinate signal transmissions from a plurality of transmitting devices. In certain instances, implementation of signaling data 150 by one or more transmitting devices may provide signal transmissions in a manner to support opportunistic reception thereof by one or more mobile devices, e.g., as configured in accordance with aspects/techniques presented herein. In example block 910, a computing platform may provide at least a portion of the signaling data (generated at least in part at example block 908) to one or more transmitting devices.

Figure 10:
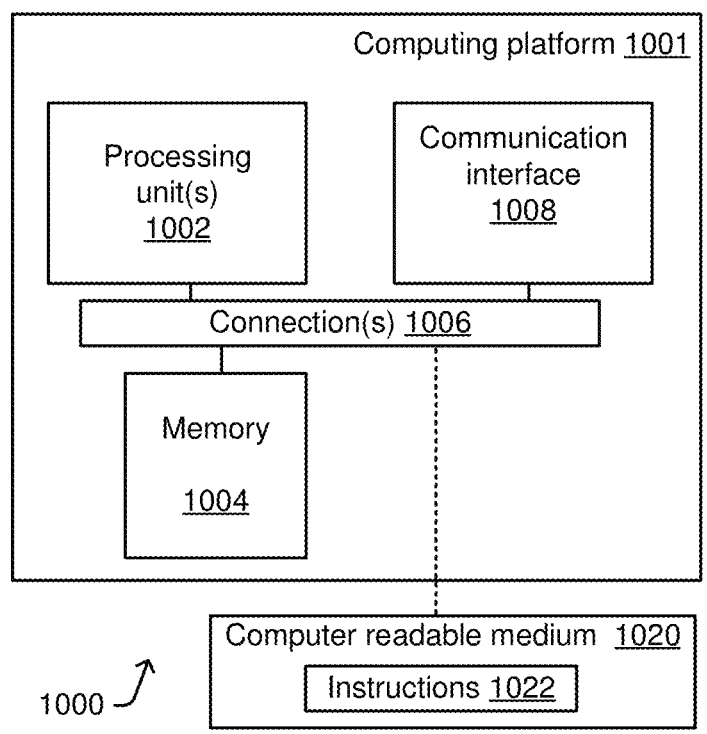
FIG. 10 is a block diagram illustrating some features of a computing platform, in accordance with certain example implementations.

Attention is next drawn to FIG. 10, which is a block diagram illustrating some features of a computing platform 1000 that may be implemented, for example, as a server 1001 provided in other device(s) 114 (see FIG. 1) to support example techniques as provided herein as part of a wireless network environment 100, process 900, process 920, etc. It should be understood that the example features shown in computing platform 1000 are not intended to show an exhaustive list of features that may be provided within such devices. Also, it should be understood that transmitting devices and/or the like in wireless network environment 100 may also comprise features similar to those presented in the examples of portable electronic device 800 or computing platform 1000, or some combination thereof.

As illustrated, server 1001 may comprise one or more processing units 1002 (e.g., to perform data processing in accordance with certain techniques provided herein) coupled to memory 1004 via one or more connections 1006 (e.g., one or more electrical conductors, one or more electrically conductive paths, one or more buses, one or more fiber-optic paths, one or more circuits, one or more buffers, one or more transmitters, one or more receivers, etc.). Processing unit(s) 1002 may, for example, be implemented in hardware or a combination of hardware and software. Processing unit(s) 1002 may be representative of one or more circuits configurable to perform at least a portion of a data computing procedure or process, including but not limited to generating assistance data possibly including generating all or part of a signal reception plan or the like with respect to at least one mobile device based, at least in part, on one or more indications of signal measuring capabilities, processing received signal data, initiating signal transmissions, accessing memory, executing instructions, estimating a position location, etc. By way of example but not limitation, a processing unit may include some form of processor circuitry as previously listed with respect to processing unit(s) 202, and may communicate with via communication interface 1008

Memory 1004 may be representative of any data storage mechanism, for example, possibly including the examples present for memory 204

In certain implementations, memory 1004 may be operatively receptive of, or otherwise configurable to couple to, a non-transitory computer readable medium 1020. Memory 1004 and/or non-transitory computer readable medium 1020 may comprise, for example, instructions 1022 for use in performing data processing, e.g., in accordance with the applicable techniques as provided herein.

Communication interface 1008 may, for example, comprise one or more wired and/or wireless network interface units, radios, modems, etc., including by way of possible example those presented for communication interface 208.

Attention is drawn once again to wireless network environment 100 in FIG. 1, which as presented in the various preceding examples may be configured to support both wideband and narrowband signaling by various types of transmitting devices to a mobile device configured to opportunistically receive and measure a plurality of such signals for position location purposes without having to retune or otherwise adjust a receiver for each expected signal. Below are some additional details with regard to some further example implementations, which are not necessarily intended to limit claimed subject matter.

As described herein, in certain implementations wireless network environment 100 may support radio access for various "Internet of Things (IoT)" devices or the like, such as, Long Term Evolution (LTE) narrowband IoT (NB-IoT) radio access, Cat-M1, CatNB1, e-MTC, LTE radio access with CIoT operational features, just to name a few examples.

In certain implementations, wireless network 106 may comprise an Evolved Packet System (EPS) having an Evolved Universal Mobile Telecommunications Service (UMTS) Terrestrial Radio Access Network (E-UTRAN) and an Evolved Packet Core (EPC) (not shown). The E-UTRAN and the EPC may, for example, be part of a Visited Public Land Mobile Network (VPLMN) that may at times be a serving network for mobile device 102 and communicate accordingly with a Home Public Land Mobile Network (HPLMN) (not shown) for mobile device 102. It should be understood that a VPLMN E-UTRAN, a VPLMN EPC and/or a HPLMN may be interconnected via network(s) 112. For example, the Internet may be used to carry messages to and from different networks such as a HPLMN and a VPLMN EPC. For simplicity these networks and associated entities and interfaces are not shown. As shown, in this example, wireless network 106 may provide packet-switched services to mobile device 102. However, as those skilled in the art will readily appreciate, the various concepts presented throughout this disclosure may be extended to networks providing circuit-switched services.

In this example, mobile device 102 may comprise any mobile device configured for the applicable radio access, e.g., NB-IoT, CIoT, LTE radio access, or the like. Mobile device 102 may be referred to as a device, a wireless device, a mobile terminal, a terminal, a mobile station (MS), a user equipment (UE), a Secure User Plane Location (SUPL) Enabled Terminal (SET) or by some other name and may correspond to (or be part of) a smart watch, digital glasses, a fitness monitor, an automobile, an appliance, a machine, a robot, a drone, a cellphone, a smartphone, a laptop, a tablet, a tracking device, a control device, or some other portable or moveable electronic device. Mobile device 102 may comprise a single entity or may comprise multiple entities such as in a personal area network where a user may employ audio, video and/or data I/O devices and/or body sensors and a separate wireline or wireless modem. Typically, though not necessarily, mobile device 102 may support wireless communication with one or more types of Wireless Wide Area Network (WWAN) such as a WWAN supporting Global System for Mobile Communications (GSM), Code Division Multiple Access (CDMA), Wideband CDMA (WCDMA), Long Term Evolution (LTE), Narrowband Internet of Things (NB-IoT), Enhanced Machine Type Communications (eMTC) also referred to as LTE category M1 (LTE-M), High Rate Packet Data (HRPD), WiMax, etc. A VPLMN EPC combined with a VPLMN E-UTRAN, and a HPLMN, may be examples of a WWAN. Mobile device 102 may support wireless communication with one or more types of Wireless Local Area Network (WLAN) such as a WLAN supporting IEEE 802.11 WiFi or Bluetooth® (BT). Mobile device 102 may support communication with one or more types of wireline network such as by using a Digital Subscriber Line (DSL) or packet cable for example. Although FIG. 1 shows only one mobile device 102, there may be many other mobile devices that can each correspond to mobile device 102.

Mobile device 102 may enter a connected state with a wireless communication network that may include a E-UTRAN. In one example, mobile device 102 may communicate with a cellular communication network by transmitting wireless signals to, and/or receiving wireless signals from, a cellular transceiver, such as an eNB in the E-UTRAN. A E-UTRAN may comprise a plurality of eNBs. An eNB may provide user plane and control plane protocol terminations toward mobile device 102. An eNB may be a serving eNB for mobile device 102 and may also be referred to as a base station, a base station device, a base transceiver station, a radio base station, a radio transceiver, a radio network controller, a transceiver function, a base station subsystem (BSS), an extended service set (ESS), or the like.

Mobile device 102 also may transmit wireless signals to, or receive wireless signals from, a transmitting device (e.g., of FIG. 1) that may comprise a local transceiver, such as an access point (AP), femtocell, Home Base Station, small cell base station, Home Node B (HNB) or Home eNodeB (HeNB), which may provide access to a wireless local area network (WLAN, e.g., IEEE 802.11 network), a wireless personal area network (WPAN, e.g., Bluetooth network) or a cellular network (e.g. an LTE network or other wireless wide area network such as those discussed in the next paragraph). Of course it should be understood that these are merely examples of networks that may communicate with a mobile device over a wireless link, and claimed subject matter is not limited in this respect.

Examples of network technologies that may support wireless communication in wireless network environment 100 include NB-IoT, but may further include GSM, CDMA, WCDMA, LTE, HRPD, eMTC and future Fifth Generation (5G) radio types. NB-IoT, CIoT, GSM, WCDMA, LTE, eMTC and 5G are technologies defined by (or expected to be defined by) 3GPP. CDMA and HRPD are technologies defined by the 3rd Generation Partnership Project 2 (3GPP2). WCDMA is also part of the Universal Mobile Telecommunications System (UMTS) and may be supported by an HNB. Cellular transceivers, such as eNBs, may comprise deployments of equipment providing subscriber access to a wireless telecommunication network for a service (e.g., under a service contract). Here, a cellular transceiver may perform functions of a cellular base station in servicing subscriber devices within a cell determined based, at least in part, on a range at which the cellular transceiver is capable of providing access service.

An eNB may be connected by an interface (e.g., the 3GPP S1 interface) to a VPLMN EPC. An EPC may include a Mobility Management Entity (MME), and a Serving Gateway (SGW) through which data (e.g., Internet Protocol (IP) packets) to and from mobile device 102 may be transferred. An MME may be a serving MME for mobile device 102 and may be a control node that processes signaling between mobile device 102 and the EPC and supports attachment and network connection of mobile device 102, mobility of mobile device 102 (e.g. via handover between network cells) as well as establishing and releasing data bearers on behalf of mobile device 102. An MME may also support User Plane (UP) data transfer to and from mobile device 102 using a 3GPP CIoT feature known as CIoT Control Plane (CP) optimization in which data packets are transferred to and from the mobile device via the MME, rather than by bypassing the MME, in order to avoid the overhead of establishing and releasing data bearers for the mobile device 102. Generally, the MME provides bearer and connection management for mobile device 102 and may be connected to a SGW and eNBs, an E-SMLC and a Visited Gateway Mobile Location Center (V-GMLC) in the VPLMN EPC.

An E-SMLC may support position location of mobile device 102 using the 3GPP control plane (CP) location solution, by way of example, as defined in 3GPP technical specifications (TSs) 23.271 and 36.305. The V-GMLC, which may also be referred to simply as a Gateway Mobile Location Center (GMLC), may provide access on behalf of an external client or another network (e.g. a HPLMN) to the position location of mobile device 102. An external client may, for example, comprise a web server or remote application that may have some association with mobile device 102 (e.g. may be accessed by a user of mobile device 102 via a VPLMN E-UTRAN, a VPLMN EPC and a HPLMN) or may be a server, application or computer system providing a position location service to some other user or users which may include obtaining and providing the location of mobile device 102 (e.g. to enable a service such as friend or relative finder, asset tracking or child or pet location).

A HPLMN may comprise a Home Gateway Mobile Location Center (H-GMLC) that may be connected to the V-GMLC (e.g. via the Internet), as well as a Packet Data Network Gateway (PDG) that may be connected to a SGW (e.g. via the Internet). A PDG may provide mobile device 102 with Internet Protocol (IP) address allocation and IP and other data access to external networks (e.g. the Internet) and to external client(s) and external server(s), as well as other data transfer related functions. In some cases, a PDG may be located in a VPLMN EPC and not in a HPLMN, for example, if mobile device 102 receives local IP breakout. A PDG may be connected to a location server, such as a Home Secure User Plane Location (SUPL) Location Platform (H-SLP) or the like. An H-SLP may, for example, support the SUPL UP location solution defined by the Open Mobile Alliance (OMA) and may support location services for mobile device 102 based on subscription information for mobile device 102 stored in an H-SLP. In some embodiments, a Discovered SLP (D-SLP) or an Emergency SLP (E-SLP) (not shown in FIG. 1), may be provided or may be accessible from a VPLMN EPC, may be used to locate mobile device 102 using the SUPL UP solution.

An H-GMLC may be connected to a Home Subscriber Server (HSS) for mobile device 102, which may comprise a central database that contains user-related and subscription-related information for mobile device 102. An H-GMLC may provide location access to the mobile device 102 on behalf of external clients. One or more of an H-GMLC, PDG, and H-SLP may be connected to an external client, e.g., through another network, such as the Internet. In some cases, a Requesting GMLC (R-GMLC) located in another PLMN may be connected to an H-GMLC (e.g. via the Internet) in order to provide location access to mobile device 102 on behalf of external clients connected to the R-GMLC. An R-GMLC, an H-GMLC and a V-GMLC may support location access to the mobile device 102, for example, using the 3GPP CP solution defined in 3GPP TS 23.271.

In particular implementations, mobile device 102 may have circuitry and processing resources capable of obtaining position location related measurements, such as measurements for SPS signals 121, measurements for signals 111-1, . . . , 111-$n$, and/or 119 from (typically terrestrial-based) their corresponding transmitting devices, which may comprise eNBs, and/or measurements signals from other local transceivers. Mobile device 102 may further have circuitry and processing resources capable of computing a position fix or estimated position location of mobile device 102 based on all or some of these example position location related measurements. In some implementations, all or part of some of the signal measurements obtained by mobile device 102 may be provided (e.g., transmitted) to a location server or the like, such as an E-SMLC, H-SLP, etc., after which a location server or the like may estimate or determine a position location for mobile device 102 based on the provided measurements.

Location related measurements obtained by mobile device 102 may include measurements of signals received from SVs belonging to SPS 120. SPS 120 may comprise, for example, a GNSS such as GPS, GLONASS, Galileo or Beidou and/or may include measurements of signals received from terrestrial transmitters fixed at known locations (e.g., such as an eNB or possibly other local transceivers). Mobile device 102 or a separate location server may obtain a position location estimate for the mobile device 102 based, at least in part, on position location related measurements using any one of several position methods such as, for example, GNSS, Assisted GNSS (A-GNSS), Advanced Forward Link Trilateration (AFLT), OTDOA, Enhanced Cell ID (ECID), WiFi, or combinations thereof. In some of these techniques (e.g. A-GNSS, AFLT and OTDOA), pseudoranges or timing differences may be measured by mobile device 102 relative to three or more terrestrial transmitters fixed at known locations or relative to four or more SVs with accurately known orbital data, or combinations thereof, based at least in part, on pilot signals, PRS or other positioning related signals transmitted by the transmitters or SVs and received at the mobile device 102. Here, location servers, such as an E-SMLC or an H-SLP, may be capable of providing positioning assistance data to mobile device 102 including, for example, information regarding signals to be measured by mobile device 102 (e.g., expected signal timing, signal coding, signal frequencies, signal Doppler, etc.), locations and/or identities of terrestrial transmitters, and/or signal, timing and orbital information for GNSS SVs to facilitate positioning techniques such as A-GNSS, AFLT, OTDOA and ECID. The facilitation may include improving signal acquisition and measurement accuracy by mobile device 102 and/or, in some cases, enabling mobile device 102 to compute its estimated location based on the location measurements. For example, a location server may comprise an almanac (e.g. a Base Station Almanac (BSA)) which indicates the locations and identities of transmitting devices in a particular region or regions such as a particular venue, and may further contain information descriptive of signals transmitted by these transceivers and transmitters such as signal power, signal timing, signal bandwidth, signal coding and/or signal frequency, just to name a few examples. In the case of ECID, a mobile device 102 may obtain measurements of signal strength (e.g. received signal strength indication (RSSI) or reference signal received power (RSRP)) for signals received from transmitting devices (e.g., eNBs and/or local transceivers) and/or may obtain a signal to noise ratio (S/N), a reference signal received quality (RSTQ), or a round trip signal propagation time (RTT) between mobile device 102 and transmitting device. Mobile device 102 may transfer measurements to a location server to determine a location for mobile device 102, or in some implementations, mobile device 102 may use measurements together with assistance data (e.g. terrestrial almanac data or GNSS SV data such as GNSS Almanac and/or GNSS Ephemeris information) received from the location server to determine a location for mobile device 102.

In the case of OTDOA, in certain example implementations, mobile device 102 may measure a Reference Signal Time Difference (RSTD) between signals, such as PRS, a Cell-Specific Reference Signal (CRS), or the like received from nearby transmitting devices. An RSTD measurement may provide the time of arrival difference between signals (e.g. CRS or PRS) received at mobile device 102 from two different transmitting devices (e.g. an RSTD between signals received from two base station devices or the like). Mobile device 102 may return the measured RSTDs to a location server which may compute an estimated position location for mobile device 102 based on known locations and known signal timing for the measured transceivers. In some implementations of OTDOA, the signals used for RSTD measurements (e.g. PRS or CRS signals) may be accurately synchronized by the transceivers or transmitters to a common universal time such as GPS time or coordinated universal time (UTC), e.g., using a GPS receiver at each transceiver or transmitter to accurately obtain the common universal time.

An estimate of a position location of a mobile device 102 may be referred to as a location, location estimate, location fix, fix, position, position estimate or position fix, and may be geodetic, thereby providing location coordinates for the mobile device 102 (e.g., latitude and longitude) which may or may not include an altitude component (e.g., height above sea level, height above or depth below ground level, floor level or basement level). Alternatively, a location of the mobile device 102 may be expressed as a civic location (e.g., as a postal address or the designation of some point or small area in a building such as a particular room or floor). A location of a mobile device 102 may also include an uncertainty and may then be expressed as an area or volume (defined either geodetically or in civic form) within which the mobile device 102 is expected to be located with some given or default probability or confidence level (e.g., 67% or 95%). A location of a mobile device 102 may further be an absolute location (e.g. defined in terms of a latitude, longitude and possibly altitude and/or uncertainty) or may be a relative location comprising, for example, a distance and direction or relative X, Y (and Z) coordinates defined relative to some origin at a known absolute location. In the description contained herein, the use of the term position location may comprise any of these variants unless indicated otherwise. Measurements (e.g. obtained by mobile device 102 or by another entity such as base station device or the like) that may be used to determine (e.g. calculate) a position location estimate for mobile device 102 may be referred to as measurements, location measurements, location related measurements, positioning measurements or position measurements and the act of determining a location for the mobile device 102 may be referred to as positioning of the mobile device 102 or locating the mobile device 102.

In one particular implementation, wireless communication system 200 may employ LTE access and synchronized signal transmission (e.g. synchronized PRS transmission). Other device(s) 114 in FIG. 1, may include a location server and an almanac (not shown). A location server and almanac may, for example, be included as part of a serving network or may be attached to or reachable from a serving network. For example, a serving network may comprise a VPLMN EPC, and location server may correspond to an E-SMLC or an H-SLP in network or may be another location server such as a Standalone Serving Mobile Location Center (SAS) (not shown). A serving network may, for example, include one or more transmitting devices, such as, a base station device operably connected to one or more antennas.

An almanac may represent a database structure or the like which may be provided as part of or otherwise accessible by a serving network and/or a location server. An almanac may be configured to store identification, location parameters, etc., for the access points and base stations (e.g., eNBs) and antennas within a serving network.

"Instructions" as referred to herein relate to expressions which represent one or more logical operations. For example, instructions may be "machine readable" or "computer readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" or "computer readable medium", may be used interchangeably, and as referred to herein may relate to media capable of maintaining expressions which are perceivable by one or more machines. For example, a storage medium may comprise one or more storage devices for storing machine-readable instructions or information. Such storage devices may comprise any one of several media types including, for example, magnetic, optical or semiconductor storage media. Such storage devices may also comprise any type of long term or short term, or volatile or non-volatile memory devices. However, these are merely examples of a storage medium, and claimed subject matter is not limited in these respects.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method for use in a computing platform, the method comprising, with the computing platform:
   receiving at least one indication of signal measuring capability from a mobile device;
   based, at least in part, on the at least one indication of signal measuring capability, generating:
   (1) assistance data for the mobile device,
   (2) signaling data for at least one transmitting device, or
   (3) both (1) and (2);
   if generated, providing the assistance data to the mobile device; and
   if generated, providing the signaling data to at least the at least one transmitting device.

2. The method of claim 1, wherein the signaling data, the assistance data, or both is indicative of a first signal to be transmitted over a first frequency band, a second signal to be transmitted over a second frequency band, or both, and wherein the second frequency band is outside of the first frequency band.

3. The method of claim 2, wherein the first frequency band comprises a wideband positioning reference signal (PRS) frequency band, the second frequency band comprises a narrowband PRS frequency band.

4. The method of claim 2, wherein the assistance data is indicative of a reception frequency band, a reception window, or both, for use, at least in part, by the mobile device to configure a receiver of the mobile device to tune to the reception frequency band and receive at least the first signal and the second signal.

5. The method of claim 2, wherein the at least one transmitting device comprises a base station device or an Internet of Things (IoT) device.

6. A computing platform comprising:
   a communication interface configured to receive at least one indication of signal measuring capability from a mobile device; and
   a processing unit coupled to the communication device and configured to, based, at least in part, on the at least one indication of signal measuring capability, generate:
   (1) assistance data for the mobile device,
   (2) signaling data for at least one transmitting device, or
   (3) both (1) and (2),
   the processing unit being further configured to initiate transmission, via the communication interface, of at least one of:
   (4) the assistance data to the mobile device if generated, and/or
   (5) the signaling data to at least the at least one transmitting device if generated.

7. The computing platform of claim 6, wherein the signaling data, the assistance data, or both is indicative of a first signal to be transmitted over a first frequency band, a second signal to be transmitted over a second frequency band, or both, and wherein at least a portion of the second frequency band is outside of the first frequency band.

8. The computing platform of claim 7, wherein the first frequency band comprises a wideband positioning reference signal (PRS) frequency band, the second frequency band comprises a narrowband PRS frequency band.

9. The computing platform of claim 7, wherein the assistance data is indicative of a reception frequency band, a reception window, or both, for use, at least in part, by the mobile device to configure a receiver of the mobile device to tune to the reception frequency band and receive at least the first signal and the second signal.

10. The computing platform of claim 7, wherein the at least one transmitting device comprises a base station device or an Internet of Things (IoT) device.

* * * * *